US011405926B2

(12) United States Patent
Yoo et al.

(10) Patent No.: US 11,405,926 B2
(45) Date of Patent: Aug. 2, 2022

(54) VISION-AIDED CHANNEL SENSING AND ACCESS

(71) Applicant: QUALCOMM Incorporated, San Diego, CA (US)

(72) Inventors: Taesang Yoo, San Diego, CA (US); Xiaoxia Zhang, San Diego, CA (US); Vinay Chande, San Diego, CA (US); Srinivas Yerramalli, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 172 days.

(21) Appl. No.: 16/802,292

(22) Filed: Feb. 26, 2020

(65) Prior Publication Data
US 2021/0266914 A1     Aug. 26, 2021

(51) Int. Cl.
*H04W 72/08*    (2009.01)
*H04W 74/08*    (2009.01)
*H04W 16/14*    (2009.01)
*H04L 5/14*     (2006.01)
*H04L 5/00*     (2006.01)

(52) U.S. Cl.
CPC ......... *H04W 72/082* (2013.01); *H04L 5/0073* (2013.01); *H04L 5/14* (2013.01); *H04W 16/14* (2013.01); *H04W 74/0808* (2013.01)

(58) Field of Classification Search
CPC ... H04W 28/04; H04W 72/04; H04W 72/042; H04W 88/08; H04W 16/14; H04W 74/0808; H04W 72/082; H04L 5/0007; H04L 5/0073; H04L 5/14
USPC .......................................... 370/329
See application file for complete search history.

(56) References Cited

U.S. PATENT DOCUMENTS

| | | | |
|---|---|---|---|
| 10,977,507 B2* | 4/2021 | An ...................... | G06K 9/00845 |
| 2010/0142458 A1* | 6/2010 | Mark .................... | H04L 5/0073 370/329 |
| 2012/0311496 A1* | 12/2012 | Cao ........................ | G06F 16/287 715/821 |
| 2014/0372439 A1* | 12/2014 | Lu ........................ | G06F 16/5838 707/737 |
| 2015/0382171 A1* | 12/2015 | Roy ....................... | H04W 48/16 370/329 |
| 2017/0048828 A1* | 2/2017 | Um ........................ | H04L 1/1854 |
| 2017/0086172 A1* | 3/2017 | Dinan ................ | H04W 72/0453 |
| 2017/0238320 A1* | 8/2017 | Fukuta .................. | H04W 72/04 370/329 |

(Continued)

*Primary Examiner* — Peter G Solinsky
*Assistant Examiner* — Sanjay K Dewan
(74) *Attorney, Agent, or Firm* — Procopio, Cory, Hargreaves & Savitch LLP

(57) ABSTRACT

Aspects are provided that allow a base station to use visual information of interfering UEs for optimizing shared channel access and beam and interference management and tracking. The base station may obtain visual information of a UE. The base station may then access a shared channel to communicate with the UE based on the visual information. After accessing the shared channel, the base station may communicate with the UE over the shared channel using one or more beams based on the visual information. Efficient channel access and communication in mmW environments may thereby be achieved.

30 Claims, 14 Drawing Sheets

(56) References Cited

U.S. PATENT DOCUMENTS

| | | | |
|---|---|---|---|
| 2017/0238342 A1* | 8/2017 | Yang | H04W 72/087 |
| | | | 370/329 |
| 2017/0331670 A1* | 11/2017 | Parkvall | H04B 7/0617 |
| 2018/0027589 A1* | 1/2018 | Yang | H04L 25/00 |
| | | | 370/329 |
| 2018/0352579 A1* | 12/2018 | Agardh | H04L 25/0206 |
| 2019/0059106 A1* | 2/2019 | Zhang | H04W 72/0446 |
| 2019/0082333 A1* | 3/2019 | Malik | H04B 7/0695 |
| 2019/0098663 A1* | 3/2019 | Zhang | H04W 74/0808 |
| 2019/0149216 A1* | 5/2019 | Tsai | H04L 5/001 |
| | | | 370/329 |
| 2019/0207667 A1* | 7/2019 | Zhou | H04L 1/0057 |
| 2020/0220693 A1* | 7/2020 | Babaei | H04L 1/1812 |
| 2020/0260486 A1* | 8/2020 | Zhou | H04W 28/0278 |

* cited by examiner

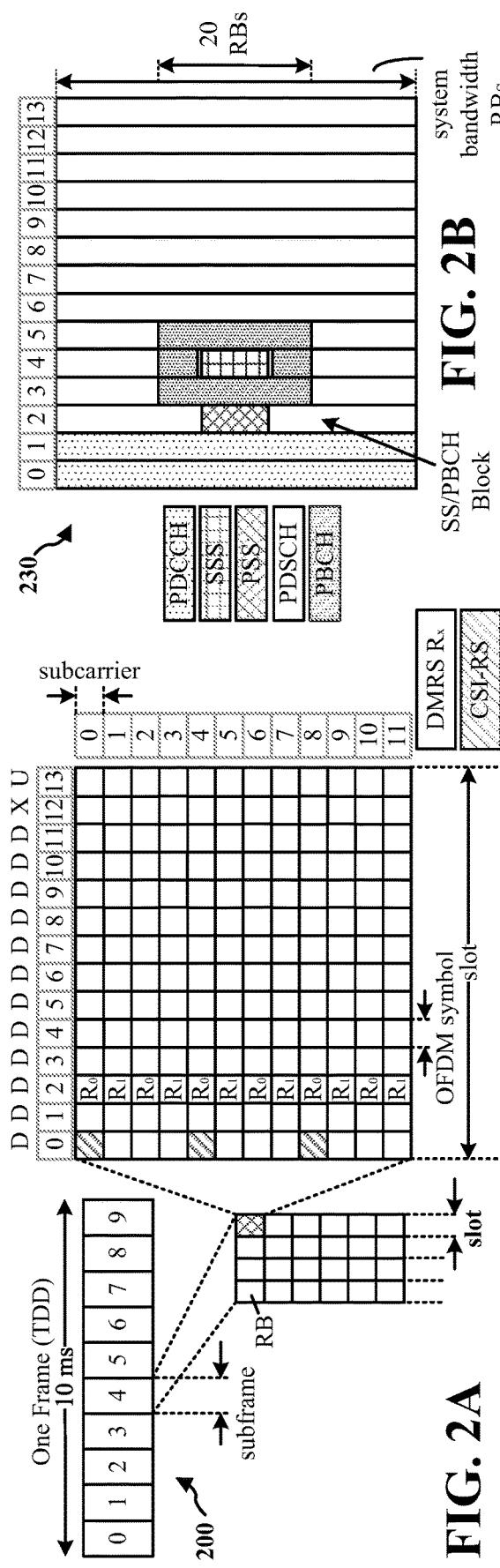
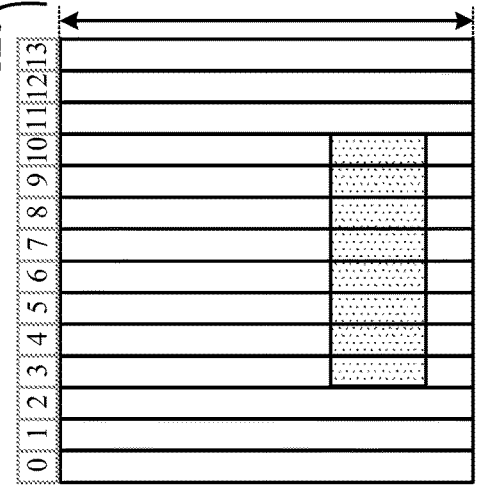
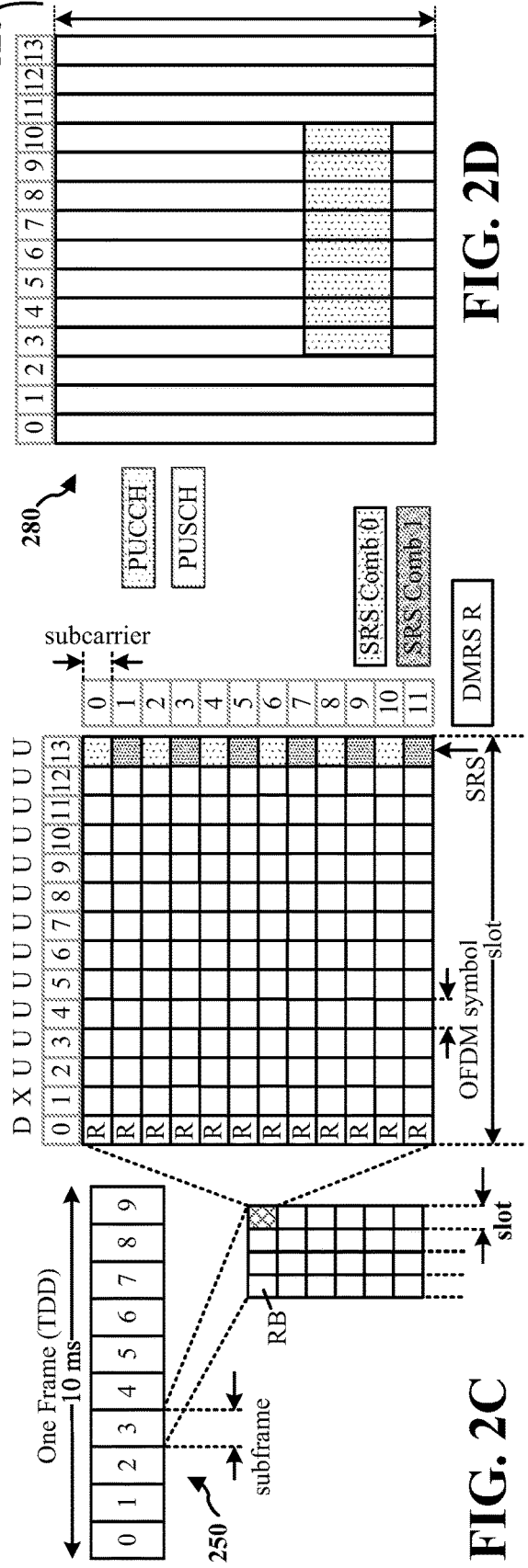
FIG. 2A FIG. 2B FIG. 2C FIG. 2D

VISION-AIDED CHANNEL SENSING AND ACCESS

BACKGROUND

Technical Field

The present disclosure relates generally to communication systems, and more particularly, to a wireless communication system between a base station and a user equipment (UE).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In certain deployments, a base station or other access point (e.g. APs, gNBs, road side units (RSUs), or remote radio heads (RRHs)) may be equipped with a camera, sensor, or other electronic device capable of detecting light, infrared energy, etc. The base station, or a server connected to multiple APs, may use such electronic devices to identify visual information regarding various UEs. Moreover, a communication channel between the base station and a UE may be shared between multiple devices, e.g. in an unlicensed spectrum. In such case, the base station may generally be required to perform a clear channel assessment (CCA) or listen before talk (LBT) procedure prior to communicating with the UE. However, CCA/LBT may be difficult to perform in millimeter wave (mmW) environments due to the use of narrow spatial beams, since the base station may be unaware of (e.g. deaf to) certain interference sources in such environments.

To minimize the likelihood of missing an interference source, one approach a base station may take is to perform LBT in every possible beam direction. However, performing LBT in every direction in mmW may be inefficient since interference management may not always be needed, may result in constant overhead and resource wastage, and may possibly impact UE battery life. Another approach the base station may take in attempt to balance interference management with resource wastage is to perform LBT in directions indicated by UE reports which include interference. However, it would be helpful for base stations to selectively perform (or not perform) CCA/LBT in certain beam directions in which interference exists or possibly exists based on visual information. Aspects of the present disclosure allow the base station to use visual information of interfering UEs for optimizing shared channel access (e.g. performing CCA/LBT in the unlicensed spectrum), and beam and interference management and tracking.

Accordingly, in an aspect of the disclosure, a method, a computer-readable medium, and an apparatus are provided. The apparatus may be a base station. The apparatus may obtain visual information of a UE, access a shared channel to communicate with the UE based on the visual information; and communicate with the UE over the shared channel using one or more beams based on the visual information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
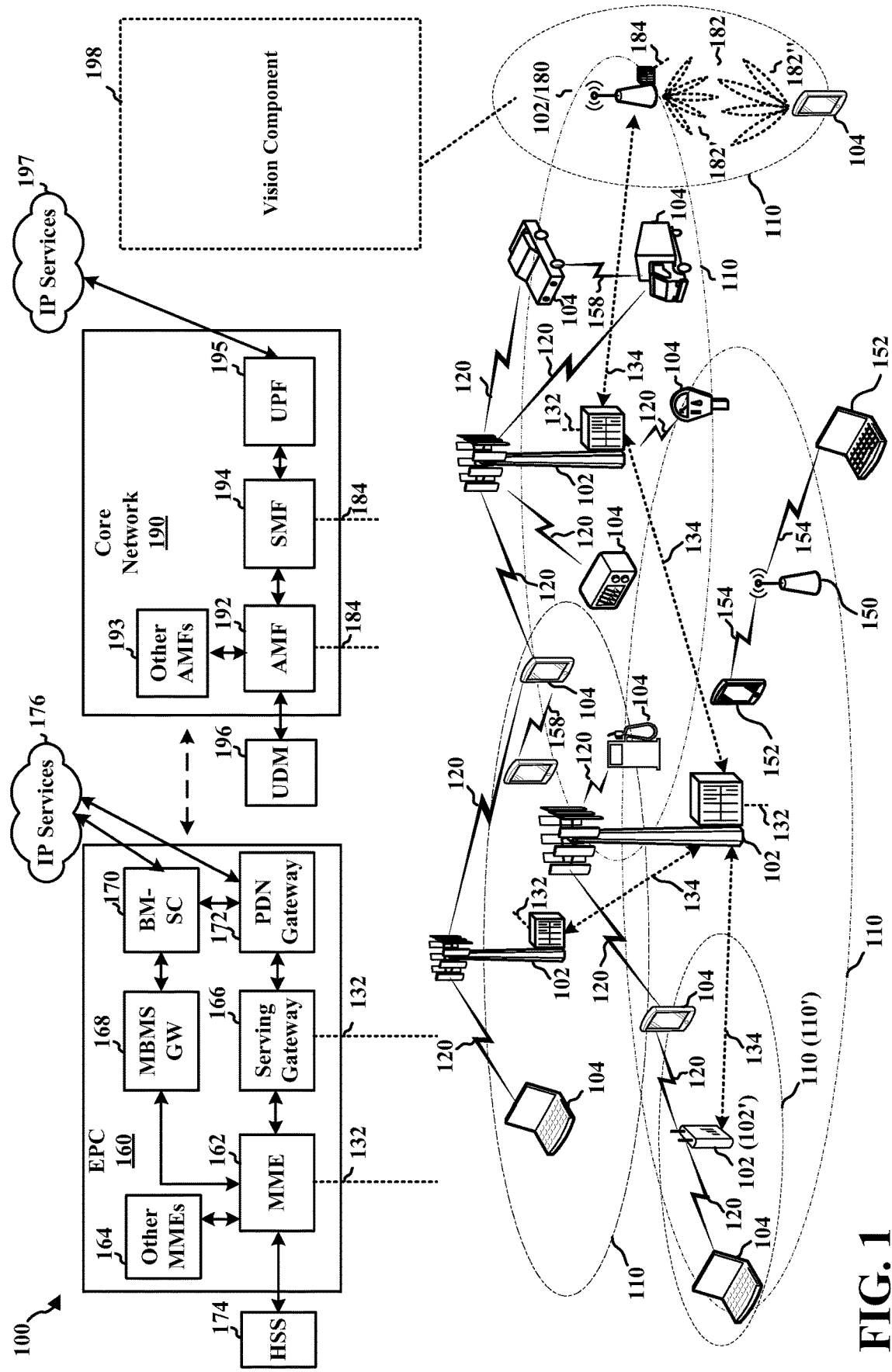
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may include a vision component 198 that is configured to obtain visual information of a UE, access a shared channel to communicate with the UE based on the visual information; and communicate with the UE over the shared channel using one or more beams based on the visual information. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
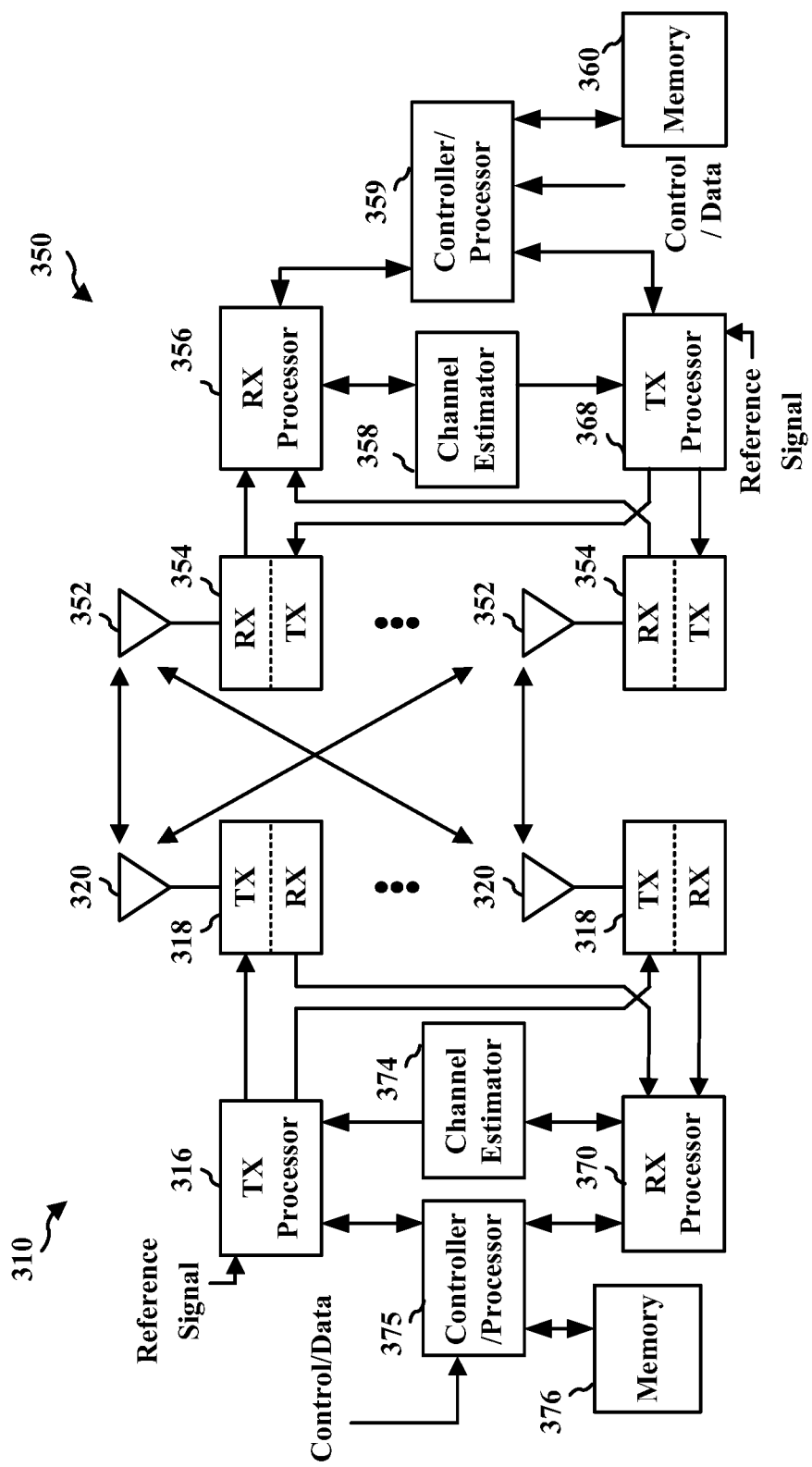
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and the controller/processor 375 may be configured to perform aspects in connection with vision component 198 of FIG. 1.

In certain deployments, a base station or other access point (e.g. APs, gNBs, RSUs, or RRHs) may be equipped with a camera, sensor, or other electronic device capable of detecting light, infrared energy, etc. The base station, or a server connected to multiple APs, may use such electronic devices to identify visual information regarding various UEs. For instance, the base station may use the visual information together with radio measurements (e.g. channel quality measurements performed in NR, LTE and reported by UEs), global positioning satellite (GPS) measurements, or sensor measurements to track the positions or locations of various UEs. A UE may also calculate an estimate of its position and feedback the location to the base station or server.

A communication channel between the base station and a UE may be shared between multiple devices, e.g. in an unlicensed spectrum. In such case, the base station may generally be required to perform a CCA or LBT procedure prior to communicating with the UE. However, CCA/LBT may be difficult to perform in mmW environments due to the use of narrow spatial beams, since the base station may be unaware of (e.g. deaf to) certain interference sources in such environments. For example, when the base station chooses one of multiple beams with narrow spatial selectivity to send a downlink communication with a UE, the base station may not detect interference from a nearby UE (e.g. an uplink transmission to another base station) that is not located within the selected beam. Unless the base station is actively listening for interference with a reception beam pointed towards the direction of interference, the base station may miss the interference source, affecting communication with the UE.

To minimize the likelihood of missing an interference source, one approach a base station may take is to perform LBT in every possible beam direction. However, due to the nature of narrow beams in mmW environments, interference may be less dominant than in the sub-6 GHz spectrum. For example, a nearby UE that may cause interference in one narrow beam direction may not cause interference in another narrow beam direction. Thus, performing LBT in every direction in mmW may be inefficient since interference management may not always be needed, may result in constant overhead and resource wastage, and may possibly impact UE battery life.

Nevertheless, even though various spatial directions may also be clean (without interference), other spatial directions may still have interference. Therefore, in attempt to balance interference management with resource wastage, the base station may perform LBT in those directions experiencing interference. For example, the base station may receive a report (e.g. a complaint) from UEs in certain spatial directions that are experiencing interference, and perform LBT on-demand ("on-demand LBT") in those directions for which such reports are received. However, it would be helpful for base stations to perform CCA/LBT or on-demand LBT in certain beam directions in which interference exists or possibly exists based on visual information.

Accordingly, aspects of the present disclosure allow the base station to use visual information of interfering UEs for optimizing shared channel access (e.g. performing CCA/LBT in the unlicensed spectrum), and beam and interference management and tracking. As described herein, an "interfering UE" may include an aggressor UE that may send an uplink transmission interfering with certain reception beams of the base station, or a victim UE that may receive a downlink transmission interfering with certain transmission beams of the base station. Such interfering UEs will be described hereinafter as "UEs" for simplicity.

In a first aspect, the base station may perform vision-based UE detection. The base station may use visual information to detect or track the position of UEs. For instance, the base station may capture, using a camera, images showing the presence of various UEs and/or users. Using this visual information, the base station may detect that some UEs are directly visible (e.g. unobstructed), while other UEs may be hidden or obstructed (e.g. in a pocket, behind a user's back, etc.). When using an optical camera, the base station may suspect the presence of hidden UEs in or around detected users based on the visual information. In such case, the base station may confirm the presence of these hidden UEs further based on other information (e.g. radio measurements, GPS measurements, etc.).

Figure 4:
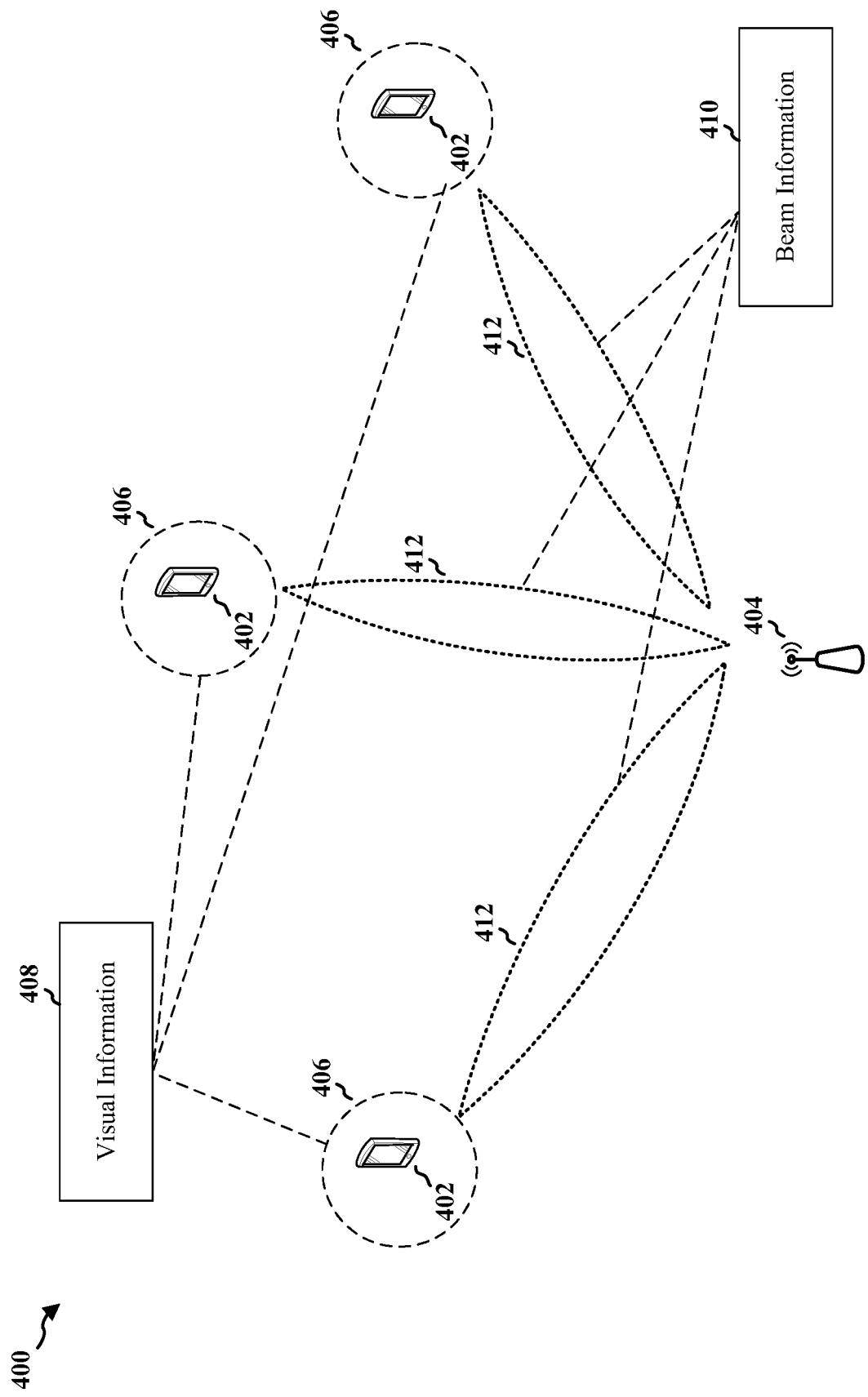
FIG. 4 is a diagram illustrating an example of a base station in communication with detected UEs based on visual information.

The base station may also perform vision-based learning based on a beam-physical proximity map. The beam-physical proximity map may identify the beam indices corresponding to the beams directed towards detected UEs, where the presence of the UEs has been identified from the visual information as described above. For example, over a predetermined time period (e.g. hours, days, etc.), the base station may create and update a beam-physical proximity map which indicates that UEs located in a physical area are largely served by, or interfere with, a subset of beams. For instance, FIG. 4 illustrates an example diagram 400 illustrating UEs 402 that a base station 404 detects in one or more physical locations 406. The physical locations 406 of each UE may be identified based on visual information 408 obtained by the base station. For example, the base station may identify that the UEs 402 are directly visible or hidden in their respective physical locations 406 based on an image captured by a camera of the base station. The base station may identify beam information 410 associated with the physical locations 406 of the UEs. For instance, the beam information may include a beam index or a subset of beam indices corresponding to one or more beams 412 directed towards or away from the physical locations 406 of the UEs. As a result, the base station may associate different physical locations of UEs that may cause interference to the base station with different beams (e.g. beam information).

In a second aspect, the base station may perform vision-based selective channel sensing. For example, based on the vision-based UE detection and learned transmission or reception beam patterns described above (e.g., with respect to FIG. 4), the base station may determine various spatial directions or beams over which the base station may experience interference from a detected UE. For those determined beams, the base station may selectively perform CCA or LBT prior to communicating with UEs in the associated physical locations. For other beams in which direction the base station did not detect any visible or hidden UEs, the base station may refrain from performing CCA or LBT. In this way, rather than performing CCA or LBT over every beam to access a shared channel, the base station may perform CCA or LBT over a subset of beams based on visual information and beam information, resulting in faster and more efficient channel access.

Figure 5:
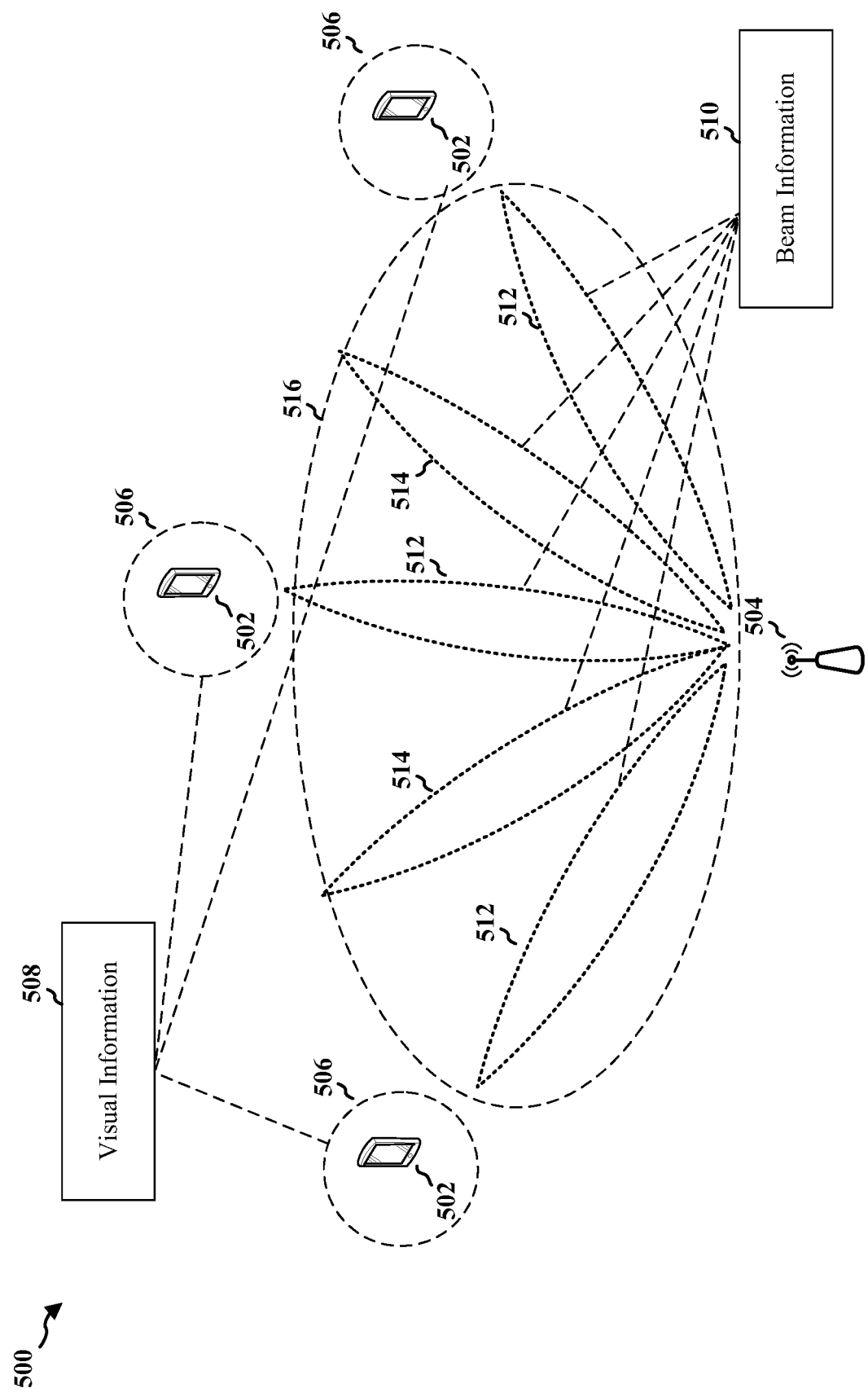
FIG. 5 is a diagram illustrating another example of a base station in communication with detected UEs based on visual information.

For instance, FIG. 5 illustrates an example diagram 500 illustrating UEs 502 that a base station 504 detects in one or more physical locations 506 based on visual information 508 obtained by the base station. The base station may identify beam information 510 associated with the physical locations 506 of the detected UEs, such as beam indices corresponding to beams 512 directed towards or away from the physical locations 506 of the UEs. The beam information 510 may also include beam indices corresponding to beams 514 that are not directed towards or away from detected UEs. For example, the base station may not detect from visual information 508 any visible or hidden UEs in physical locations corresponding to beams 514. Accordingly, when attempting to communicate with the UEs 502 over a shared channel 516, the base station may select to perform CCA or LBT to access the channel when communicating over beams 512 and may select to refrain from performing CCA or LBT to access the channel when communicating over beams 514. The base station may access the shared channel 516 for beams 512 when the performed CCA or LBT is successful, while the base station may access the shared channel 516 for beams 514 without performing CCA or LBT.

In a third aspect, the base station may perform vision-based spatial localization in channel sensing. Rather than performing individual CCAs or LBT procedures over various narrow beams based on visual information and beam information as described above in the example of FIG. 5, in this aspect the base station performs a single CCA or LBT procedure to determine if the shared channel is busy over a wide beam. For example, the wide beam may include a 360 degree angle (e.g. an omni-beam) or less (e.g. a pseudo-omni beam) and may include lower transmission power than the narrow beams. If the LBT is successful, the base station may assume all directions are free of interference and accordingly access the shared channel and communicate with the UEs. However, if the LBT is unsuccessful, then rather than refraining from accessing the shared channel, the base station may determine a group of narrow beams within the wide beam that correspond to physical locations of detected UEs. The base station may determine the group of narrow beams based on visual information and beam information, as described above for example with respect to FIGS. 4 and 5. The base station may then assume that the determined beams are associated with the interference source(s). For example, the base station may expect to receive ready-to-send (RTS)/clear-to-send (CTS)/reservation signals from UEs only in the directions of the determined beams. As a result, the base station may determine that the remainder of narrow beams within the wide beam are free of interference, and the base station may opportunistically communicate on the shared channel in the direction(s) of the remainder of narrow beams without performing LBT.

Figure 6:
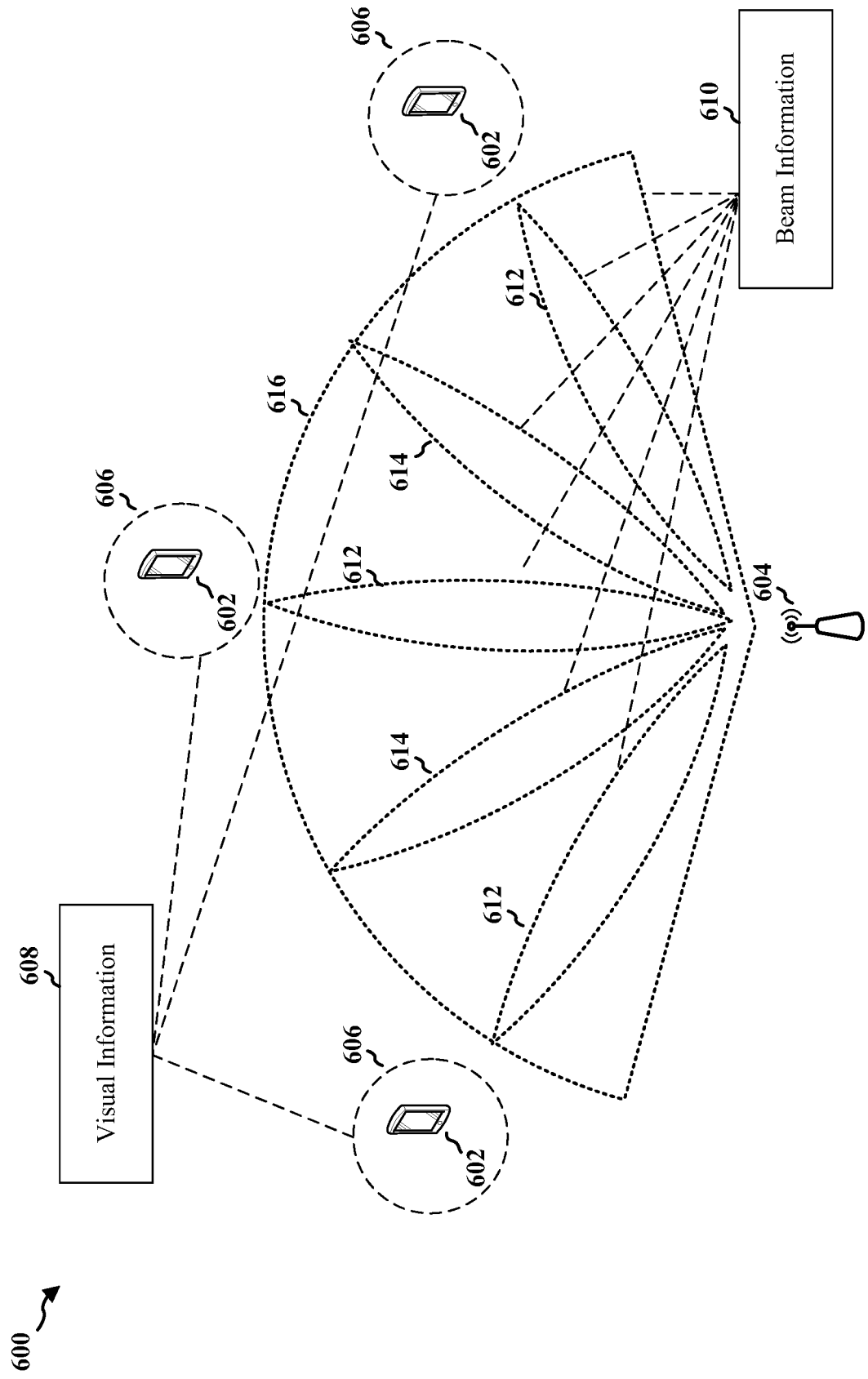
FIG. 6 is a diagram illustrating another example of a base station in communication with detected UEs based on visual information.

For instance, FIG. 6 illustrates an example diagram 600 illustrating UEs 602 that a base station 604 detects in one or more physical locations 606 based on visual information 608 obtained by the base station. The base station may identify beam information 610 associated with the physical locations 606 of the detected UEs, such as beam indices corresponding to beams 612 directed towards or away from the physical locations 606 of the UEs. The beam information 610 may also include beam indices corresponding to beams 614 that are not directed towards or away from detected UEs. For example, the base station may not detect from visual information 608 any visible or hidden UEs in physical locations corresponding to beams 614. Accordingly, when attempting to communicate with the UEs 602 over a shared channel, the base station may perform CCA or LBT to access the channel over a wide beam 616. The wide beam may be wider than the narrow beams 612, 614, including, for example, a 360 degree or lower angle with respect to the base station. If the performed CCA or LBT is successful, the base station may access the shared channel for all beams 612, 614 to communicate with the UEs 602. If the performed CCA or LBT fails, the base station may identify the beams 614 which are not associated with detected UEs based on the visual information 608 and the beam information 610, and the base station may access the shared channel for the beams 614 without performing another CCA or LBT.

In a fourth aspect, the base station may perform vision-based channel access without CCA or LBT. For example, when the base station intends to communicate with a UE being served by the base station (e.g. a serving UE), the base station may determine a transmission or reception beam corresponding to a location of the serving UE that does not interfere with (correspond to physical locations of) other detected UEs. The base station may determine the transmission or reception beam based on vision based UE detection and learned transmission or reception beam patterns, e.g. as described above with respect to FIG. 4, and further based on line-of-sight geometry or non-line-of-sight geometry associated with the UEs (e.g. reflectors). Reflector information (e.g. the positions of walls and objects) may be learned over time from visual information and radio measurements, as well as map information including beam-physical proximity maps where available. As a result, the base station may assume no interference exists over the determined beam, and therefore the base station may access the shared channel to communicate with the serving UE over the beam without performing CCA or LBT.

Figure 7:
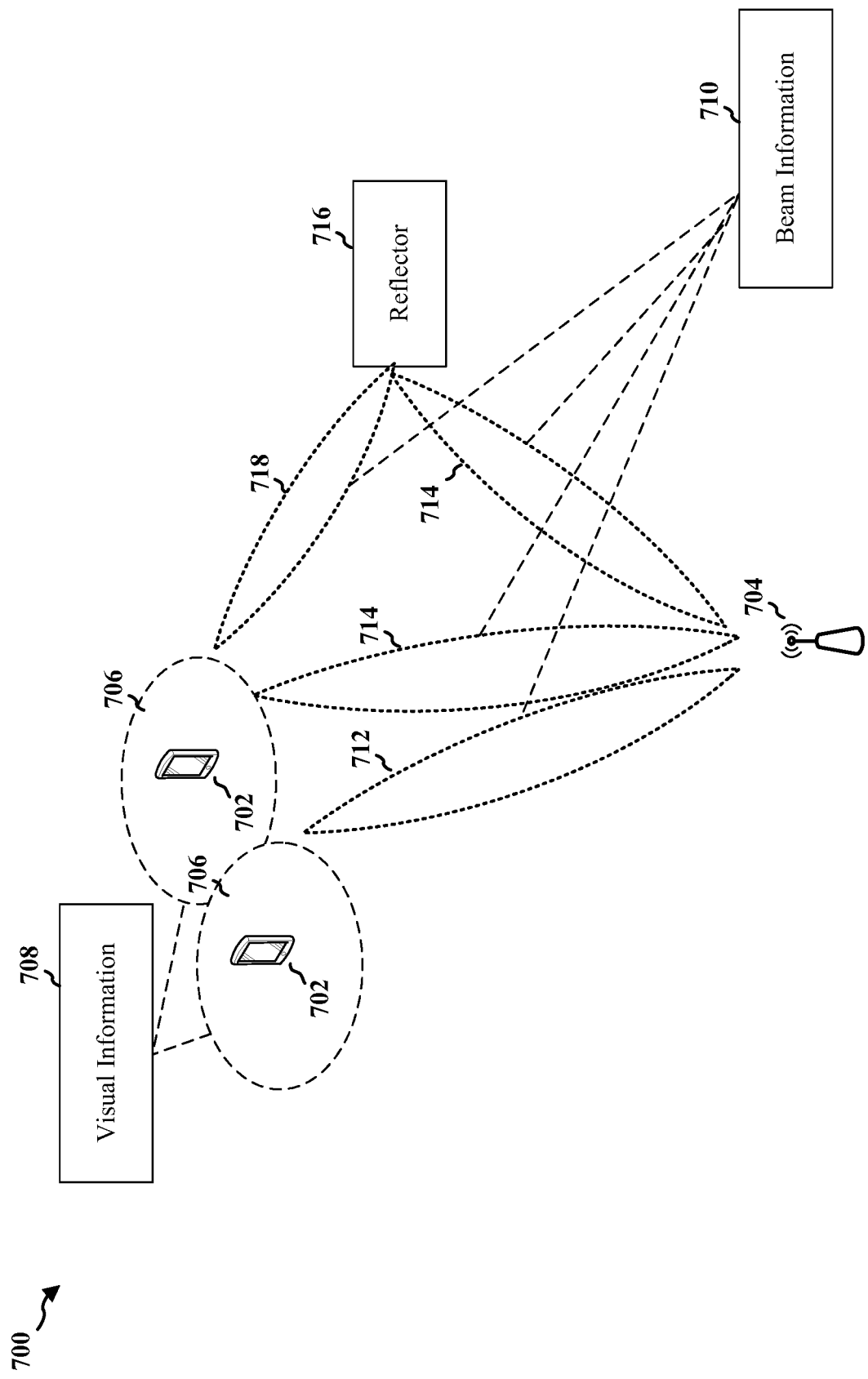
FIG. 7 is a diagram illustrating another example of a base station in communication with detected UEs based on visual information.

For instance, FIG. 7 illustrates an example diagram 700 illustrating UEs 702 that a base station 704 detects in one or more physical locations 706 based on visual information 708 obtained by the base station. The base station may identify beam information 710 associated with the physical locations 706 of the detected UEs, such as beam indices corresponding to beams 712, 714, 718 directed towards or away from the physical locations 706 of the UEs. When attempting to communicate with the right UE 702 (e.g. a serving UE in this example) over a shared channel, the base station may determine that beam 712 may interfere with transmissions or receptions of the left UE 702 (e.g. a detected UE in this example) based on the visual information 708 and beam information 710. However, the base station may also determine that beams 714, 718 do not interfere with the left UE 702 or other detected UEs based on the visual information 708, beam information 710, line of sight geometry (in the case of left beam 714) or non-line of sight geometry (in the case of right beam 714 reflected by reflector 716 as beam 718). Accordingly, when the base station selects one of the beams 714, 718 to communicate with the serving UE, the base station may access the shared channel without performing CCA or LBT.

In a fifth aspect, the base station may perform vision-based LBT. In this aspect, when the base station intends to communicate with a UE being served by the base station (e.g. a serving UE), and the base station determines that a transmission beam or a reception beam corresponding to a location of the serving UE may interfere with or (correspond to a physical location of) another detected UE, the base station may trigger LBT or on-demand LBT prior to accessing the shared channel over the determined beam. The base station may determine the transmission or reception beam based on vision-based UE detection and learned transmission or reception beam patterns, e.g. as described above with respect to FIG. 4, and further based on line-of-sight geometry or non-line-of-sight geometry associated with the UEs (e.g. reflectors), e.g., as described above with respect to FIG. 7. For the determined beam, the base station may selectively perform CCA or LBT prior to communicating with the serving UE. For other beams in which direction the base station did not detect any visible or hidden UEs, the base station may refrain from performing CCA or LBT. Alternatively, the base station may trigger LBT over one or more of the other beams in certain circumstances even if the base station fails to detect another UE based on the visual information.

Figure 8:
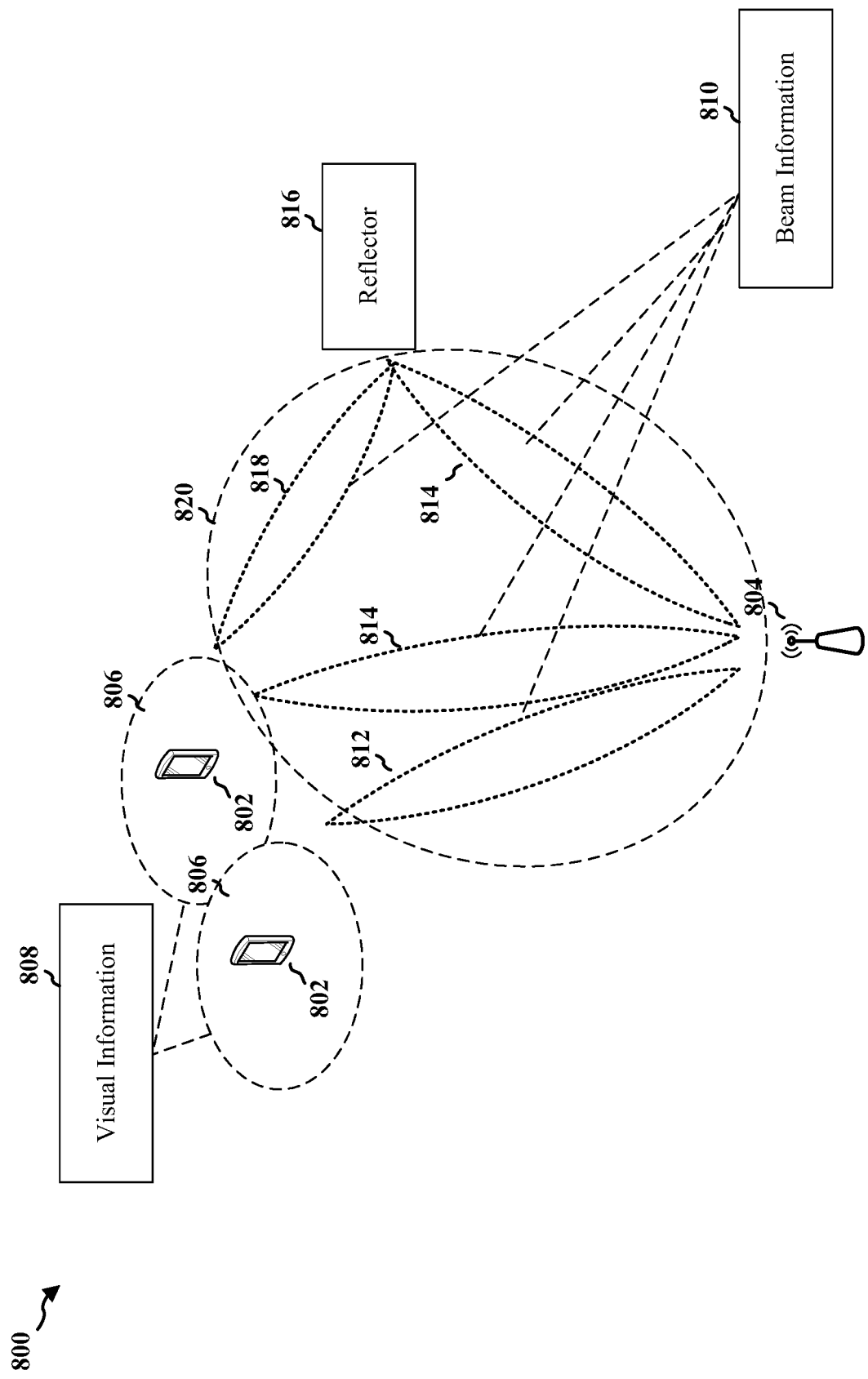
FIG. 8 is a diagram illustrating another example of a base station in communication with detected UEs based on visual information.

For instance, FIG. 8 illustrates an example diagram 800 illustrating UEs 802 that a base station 804 detects in one or more physical locations 806 based on visual information 808 obtained by the base station. The base station may identify beam information 810 associated with the physical locations 806 of the detected UEs, such as beam indices corresponding to beams 812, 814, 818 directed towards or away from the physical locations 806 of the UEs. When attempting to communicate with the right UE 802 (e.g. a serving UE in this example) over a shared channel 820, the base station may determine that beam 812 may interfere with transmissions or receptions of the left UE 802 (e.g. a detected UE in this example) based on the visual information 808 and beam information 810. Moreover, the base station may also determine that beams 814, 818 do not interfere with the left UE 802 or other detected UEs based on the visual information 808, beam information 810, line of sight geometry (in the case of left beam 814) or non-line of sight geometry (in the case of right beam 814 reflected by reflector 816 as beam 818).

However, rather than immediately communicating with the serving UE over the non-interfering beams (e.g. as in the example of FIG. 7), in this example the base station may choose to perform a LBT procedure and communicate with the serving UE over the interfering beam(s). For example, the base station may select to perform CCA or LBT to access the shared channel 820 when communicating with the serving UE over beam 812, while the base station may select to refrain from performing CCA or LBT to access the shared channel 820 when communicating with the serving UE over beams 814, 818. As a result, the base station may access the shared channel for beam 812 when the performed CCA or LBT is successful, while the base station may access the shared channel for beams 814, 818 without performing CCA or LBT. Alternatively, the base station may conservatively select to perform CCA or LBT prior to accessing the channel for one or more of beams 814, 818, even though no UEs 802 may be detected along those directions.

In the various aspects described above, the base station may access the shared channel by performing (or not performing) CCA or LBT based on visual information and beam information associated with detected UEs. However, in these aspects, the base station detects UEs regardless of whether the UEs are inactive or, even if active, not causing interference (e.g. over its own transmission beam). Therefore, when the base station detects UEs based on visual information, the base station may further identify individual UEs, create and update a jamming graph based on determined interference characteristics of the UE, and/or determine a transmission or reception activity of the UE to improve the aforementioned vision-based channel access and LBT procedures. As used herein, "identify" in the context of identifying individual UEs includes learning interference characteristics of a detected UE and attributing it to particular UE(s) indicated in the visual information. For example, when the base station detects a UE of unknown identity from an image captured by a camera, the base station may identify the UE by performing energy sensing, preamble sensing, or other forms of uplink radio measurement and vision-based tracking to determine interference characteristics of that particular UE (e.g. using machine learning, neural networks, etc.).

The UE identification may allow the base station to learn whether a particular UE indicated in the visual information is causing interference to or receiving interference from the base station, to attribute the given interference to particular UE(s), and to determine transmission or reception activity on a per-UE basis. For instance, the base station may determine an angle or arrival (AoA) or reception beam index corresponding to a determined beam to identify whether a UE is a serving UE or an interfering UE. The base station may also use the AoA or reception beam index to periodically sense a channel over the determined beam towards an interfering UE in order to build a jamming graph and determine the activity of the interfering UE. For example, the base station may determine from the visual information that a UE has been located in a physical location for a specified period of time (e.g. an hour), tune a determined beam to a corresponding AoA of the UE, and then determine whether the UE has traffic activity over that beam. Alternatively, the base station may visually track changing UE positions and Doppler-induced changes in uplink interference patterns to determine the identity of a UE indicated in visual information. For instance, if the base station determines from visual information that a UE has moved from one physical location to another during a particular time, and the base station receives a time-varying transmission over the channel, the base station may correlate the time-varying transmission with the moving UE based on a calculation of the UE's velocity and the visual information, thus determining that the transmission activity is sourced from the UE. Moreover, the base station may use visual cues in the visual information (e.g. a user typing in a smartphone, etc.) and temporal interference patterns (e.g. on/off) to determine the identity of a UE indicated in the visual information. When interference is detected (or not detected) from an identified UE over a determined beam, the base station may update a jamming graph indicating the interference activity (or lack of activity) between the base station and UE associated with the corresponding beam.

As a result, the base station may further optimize the fourth and fifth aspects (as described above with respect to FIGS. 7 and 8) described above by considering UEs that the base station determines to be active (e.g. includes a Tx/Rx activity) and possibly causing interference (e.g. includes an interference characteristic). For example, referring to FIG. 7, when attempting to communicate with the right UE 702 (e.g. the serving UE in this example) over a shared channel, the base station 704 may determine whether beam 712 may interfere with transmissions or receptions of the left UE 702 (e.g. a detected UE in this example) not only based on the visual information 708 and the beam information 710, but also based on a transmission or reception activity and an interference characteristic of the left UE. For instance, if the base station determines that the left UE 702 is inactive (e.g. the UE is not transmitting or receiving) and/or does not include any interference characteristics (e.g. sensed energy levels from the UE are low), the base station may select beam 712 in addition to beams 714, 718 to communicate with the serving UE and may access the shared channel over beam 712 without performing CCA or LBT.

Similarly, referring to FIG. 8, when attempting to communicate with the right UE 802 (e.g. a serving UE in this example) over the shared channel 820, the base station may determine whether beam 812 may interfere with transmissions or receptions of the left UE 802 (e.g. a detected UE in this example) not only based on the visual information 808 and beam information 810, but also based on a transmission or reception activity and an interference characteristic of the left UE. For instance, if the base station determines that the left UE 802 may be inactive (e.g. the UE is not transmitting or receiving) and/or does not include any interference characteristics (e.g. sensed energy levels from the UE are low), the base station may select to perform CCA or LBT (e.g. on-demand LBT) to access the shared channel 820 when communicating with the serving UE over beam 812. The base station may access the shared channel for beam 812 when the performed CCA or LBT is successful.

The base station may additionally condition performance of any of the aspects described above (e.g. with respect to FIGS. 4-8) for certain interfering UEs. For example, the base station may perform vision-based channel access as described according to the fourth aspect illustrated in FIG. 7, or vision-based LBT as described according to the fifth aspect illustrated in FIG. 8, on condition that the detected UE 702, 802 is served by a different network than a network of base station 704, 804, is served by a same network as the network of the base station 704, 804 that uses a dynamic time division duplexing (TDD) scheme, or is served by the base station and using a full duplex scheme. The rationale here is that the base station may not need to consider whether to avoid channel access and communication over certain beams, or alternatively whether to perform CCA or LBT over certain beams, when communicating with served or other UEs that are not likely to cause interference with the base station in the first place (e.g. since the base station may have control over transmission/reception scheduling of the UE). For example, referring to FIGS. 7 and 8, if left UE 702, 802 is served by a different base station within the same network as base station 704, 804 and operates under a static TDD (as opposed to dynamic) or a FDD deployment, and/or the UE is half duplex, the UE's transmissions/receptions may be synchronized with that of the base station and therefore may never cause interference to the base station. As a result, the base station may access the shared channel over beams 712, 812 without performing LBT regardless of the visual information 708, 808 or transmission/reception activity of left UE 702, 802.

In some cases, the base station may frequently experience interference from directions or beams (e.g. reception beams) where no UE is visually detected and no reflection path to a UE is visually detected (e.g. due to obstructed UEs or unidentified non-line-of-sight paths). The base station may determine this interference when performing UE identification as described above. For instance, the base station may identify interference characteristics (e.g. high energy levels) along one or more beam directions corresponding to physical locations where UEs are not visually detected. In such cases, the base station may suspect undetected, interfering UEs in those physical locations. Accordingly, the base station may be conservative in channel access and communication by protecting interference to or from all suspected interfering UEs. For example, the base station may avoid using certain beam directions or reception beam indices associated with physical locations of the suspected interfering UEs, or the base station may trigger on-demand LBT in directions or reception beam indices associated with physical locations of suspected interfering UEs.

For instance, as an alternative to the examples of FIGS. 7 and 8, the base station 704, 804 may determine based on UE identification (e.g. interference characteristic and transmission/reception activity determination) that beams 718, 818 experience interference from one or more undetected UEs. For example, reflector 716, 816 may be obstructing an unidentified interference source (e.g. an undetected UE) that interferes with beams 718, 818. As a result, the base station may refrain from using beams 718, 818 (e.g. via right beam 714, 814) for communicating with the right UE 702, 802 based on the presence of the unidentified interference source. Alternatively, the base station may perform CCA or LBT (e.g. on-demand LBT) over beam 718, 818 (e.g. via right beam 714, 814) for communicating with the right UE 702, 802 based on the presence of the unidentified interference source.

In another aspect, the base station may perform vision-based resource overloading for autonomous uplink transmissions of UEs. In some cases (e.g. mainly for the sub-7 GHz spectrum), the base station may pre-assign resources to UEs to autonomously perform uplink transmissions, rather than scheduling uplink transmissions from these UEs. The base station may pre-assign such resources in cases, where, for example, the base station may not be aware of the uplink traffic and may not afford to assign orthogonal resources for autonomous uplink transmission. For example, the UEs may include sensor devices which occasionally transmit small packets which require minimal latency and power consumption. For these UEs, scheduling uplink resources for such small packets may be inefficient, so the base station overloads the same resources for each of these UEs to occasionally use for uplink transmissions.

However, such pre-assignment of identical resources for multiple UEs may lead to collision, although infrequently. While the UEs may attempt to perform channel sensing to check if a shared channel is clear prior to autonomously sending an uplink communication, e.g. using a CCA or LBT procedure with a different random backoff or starting point for transmission, these UEs may not be able to sense other UEs which are far away (e.g. hidden nodes), and so collision may still result. To address this problem, the base station may group the UEs into one or more clusters based on the visual information indicating the position of the UEs. For instance, the base station may group UEs which are identified within the same vicinity (e.g. close together) into one cluster, and the base station may group UEs which are identified as not within the same vicinity (e.g. far apart) into different clusters. Since the UEs which are within the same vicinity are close enough to detect each other's uplink transmissions, the base station may overload or pre-assign the UEs in the same cluster with autonomous uplink resources. Thus, when the UEs within the same cluster perform channel sensing, the UEs may detect each other, obtain different random backoffs or starting points with respect to each other, and thereby avoid collision since the UE with the earlier starting point will block access of UEs with later starting points. On the other hand, the base station may assign orthogonal resources to the UEs in different clusters since these UEs may be too far apart to be able to detect each other's uplink transmissions. Accordingly, when the UEs within different clusters perform channel sensing, the UEs may transmit on orthogonal resources with respect to each other and thereby also avoid collision, without hidden node problems due to overloading resources.

Figure 9:
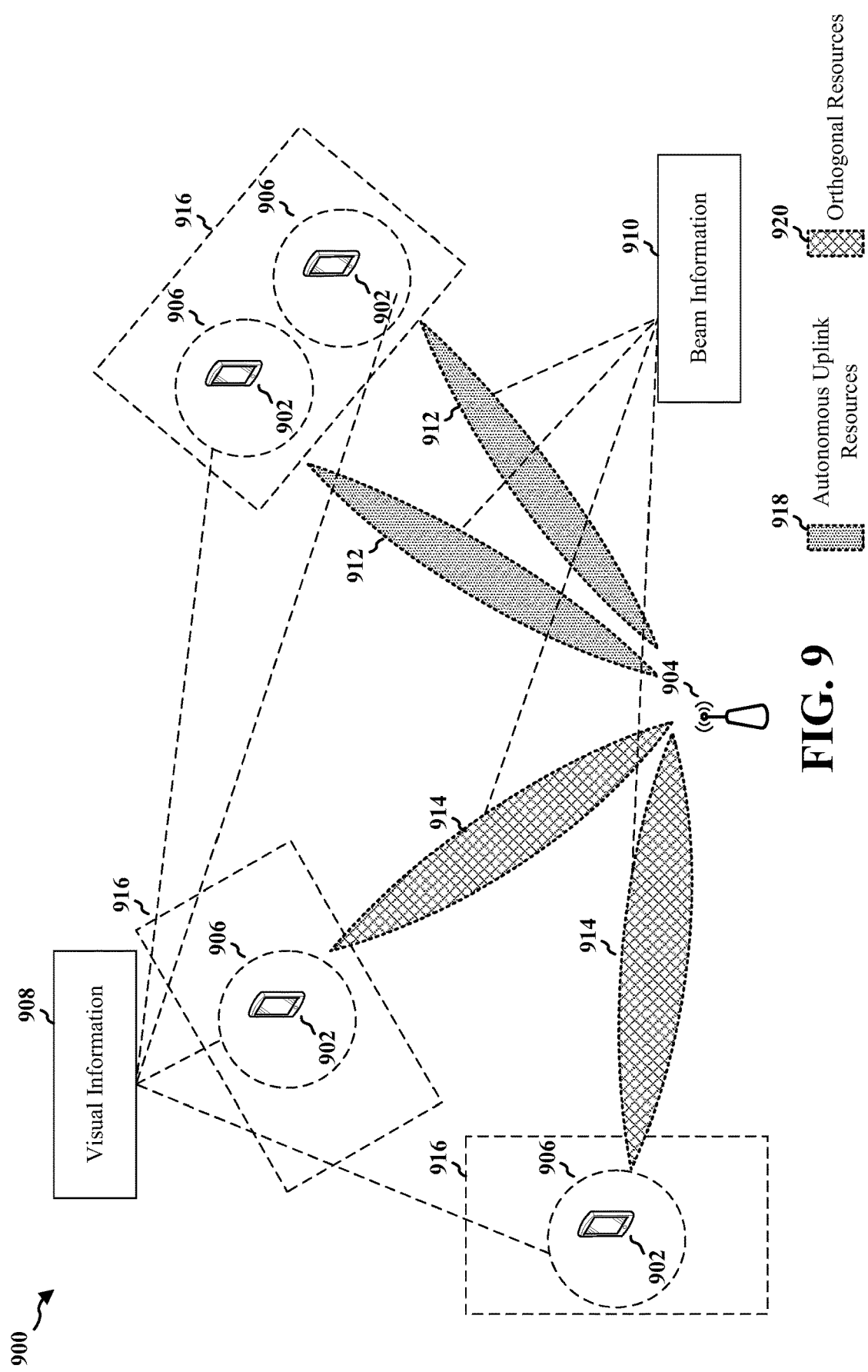
FIG. 9 is a diagram illustrating another example of a base station in communication with detected UEs based on visual information.

For instance, FIG. 9 illustrates an example diagram 900 illustrating UEs 902 that a base station 904 detects in one or more physical locations 906 based on visual information 908 obtained by the base station. The base station may identify beam information 910 associated with the physical locations 906 of the detected UEs, such as beam indices corresponding to beams 912, 914 directed towards or away from the physical locations 906 of the UEs. The base station may determine one or more clusters 916 of the UEs 902 based on the visual information 908. For example, the base station may determine that the UEs in one or more physical locations 906 which within the same vicinity may be grouped into the same cluster 916, while the UEs in physical locations which are far away from each other may grouped into different clusters 916. For instance, the base station may determine that UEs which are more than 10 feet apart from each other (or some other number) may be in separate physical locations or vicinities and therefore grouped into separate clusters. The base station may then assign autonomous uplink resources 918 to the UEs 902 which are grouped in the same cluster for communicating over respective beams 912. Similarly, the base station may assign orthogonal resources 920 to the UEs which are grouped in different clusters for communicating over respective beams 914. The base station may then communicate with the UEs using beams 912, 914 accordingly over the shared channel after accessing the channel according to any of the aspects described above (with respect to FIGS. 4-8)

In a further aspect, the base station may perform a vision-based indoor or outdoor determination for communicating with UEs. The base station may determine whether the base station or one or more UEs are indoors or outdoors based on obtained visual information (e.g. visual cues). Based on this determination, the base station may switch its medium access method, e.g. using a different energy detection (ED) threshold or LBT mechanism, and/or switch its transmit power, e.g. Equivalent Isotropically Radiated Power (EIRP), in order to further optimize communication with the UEs. For example, if the base station determines based on images captured using a camera that the base station or any of the UEs are indoors (e.g. based on the presence of windows, walls, etc.), the base station may determine that less path loss in transmission may result and subsequently reduce the transmission power over those beams determined to be directed towards or away from those UEs (according to the various aspects described above). In another example, if the base station similarly determines that the base station or any of the UEs are outdoors, the base station may determine that there is a higher likelihood of interference by other UEs and subsequently reduce the LBT ED threshold to increase likelihood of detection when performing CCA. The base station may also determine whether to perform CCA or LBT, or to refrain from performing CCA or LBT, as described according to the various aspects above based on whether the base station or UEs are indoors or outdoors. For instance, if the base station and UEs are both indoors, the base station may refrain from performing CCA or LBT since the base station may assume that there are no interfering UEs in such situation. Other examples affecting shared channel access and/or communication with UEs based on indoor/outdoor determination are possible.

The base station may determine whether the base station or a UE is indoors or outdoors based on a hard determination, e.g., that all beams determined to correspond to a physical location of the UE (or base station) are directed indoors or outdoors. However, indoor/outdoor determination may also be soft, e.g., based on a subset of the beams. For instance, if the base station is indoors and if n beams are determined to be associated with a physical location of a UE (according to the various aspects described above), the base station may determine that the UE is outdoors if k of the n beams point outdoors, e.g., through a window. Thus, in one example, the base station may determine based on the visual information and for a subset of beams that the UE is outdoors. Accordingly, the base station may increase transmission power when communicating with the outdoor UE over the determined beams to account for, e.g., increased path loss or a higher likelihood of interference by other UEs. Other examples affecting shared channel access and/or communication UEs based on soft indoor/outdoor determination are possible.

In an additional aspect, the base station may perform vision-based beam codebook selection. The base station may use visual information (e.g. visual cues obtained from images captured by a camera) to identify a subset of beams from an oversampled codebook, and the base station may communicate with the UEs based on the subset of beams. For example, although an oversampled codebook may contain fine sampling in azimuth and elevation, the base station may determine that various beam directions based on the codebook may be inapposite due to a position of the base station. For instance, if the base station determines that it is ceiling-mounted or wall-mounted based on visual information, the base station may identify that half of the azimuth beams may not be useful (e.g. they may point towards the wall).

As a result, to further optimize communication with the UEs, the base station may determine a subset of the beams from the codebook to deploy based on base station position information (e.g. ceiling-mounting, wall-mounting, etc.) identified from the visual information. For instance, out of 512 fine beams configured in the codebook, the base station may select 64 synchronization signal block (SSB) beams which are identified as not pointing towards a wall or ceiling based on visual information captured by a camera of the base station. Furthermore, the base station may dynamically determine the subset of beams based on the positions of the UEs identified from the visual information. For instance, after selecting the 64 beams in the example above, the base station may determine a subset of the 64 beams to include fine granular beams pointing towards physical locations of UEs and/or to exclude fine granular beams which may interfere with detected UEs. Thus, the base station may consider base station position information when accessing the shared channel or communicating with UEs according to the various aspects described above with respect to FIGS. 4-9. For example, rather than performing CCA or LBT on beams that may interfere with detected UEs, the base station may provide further optimization by not selecting those beams from the codebook to begin with based on the base station position information.

Figure 10:
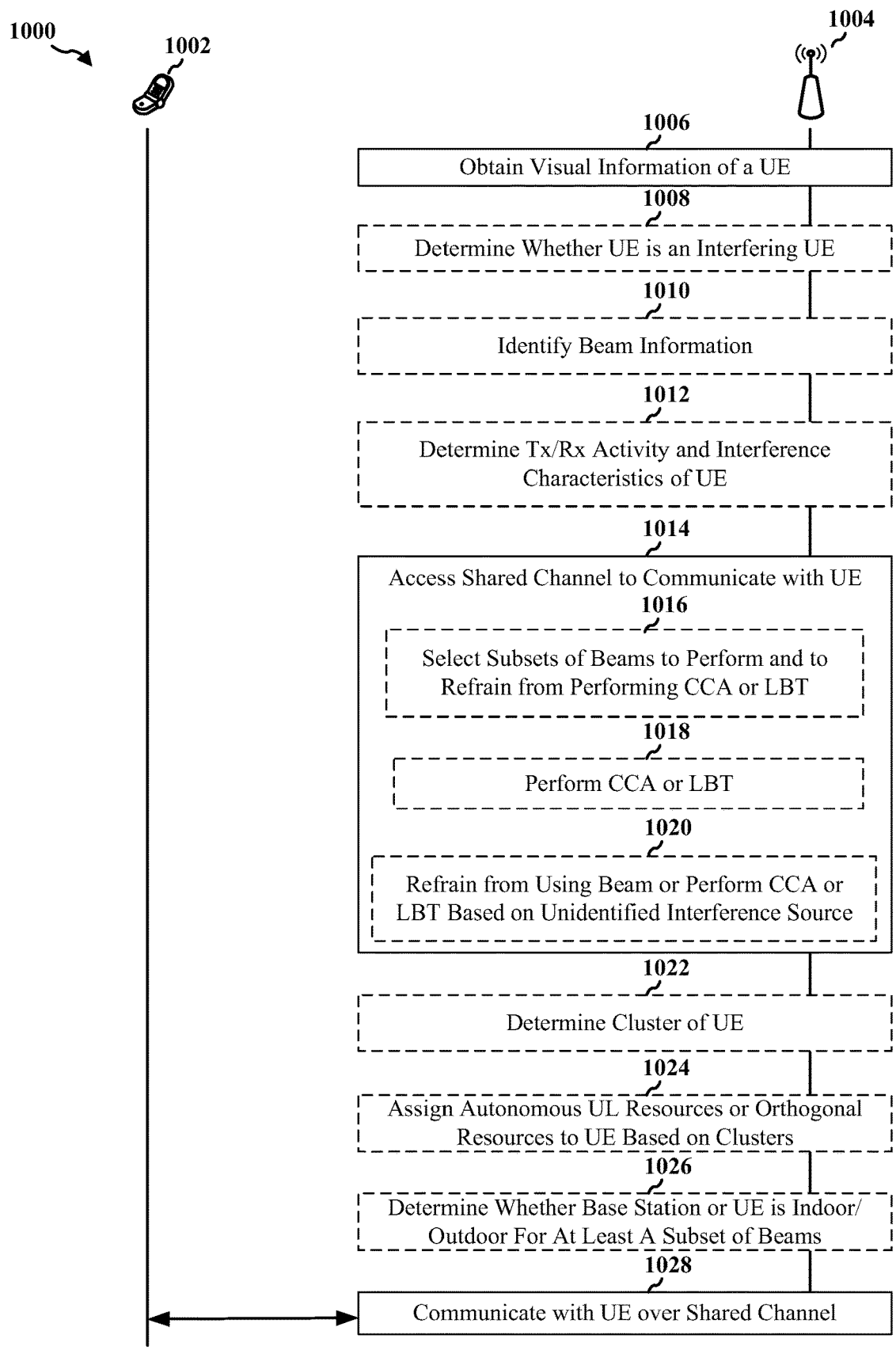
FIG. 10 is a call flow diagram illustrating an example of wireless communication between a base station and a UE.

FIG. 10 illustrates a call flow diagram 1000 of an example of wireless communication between a UE 1002 and a base station 1004 according to the various aspects of the present disclosure. Optional aspects are illustrated in dashed lines. At block 1006, the base station may obtain visual information of a UE. For instance, the base station may capture, using a camera, images showing the presence of various UEs and/or users. For example, referring to FIGS. 4-9, the base station may obtain visual information (e.g. visual information 408, 508, 608, 708, 808, 908), which the base station may use to detect whether some UEs are directly visible (e.g. unobstructed), while other UEs may be hidden or obstructed (e.g. in a pocket, behind a user's back, etc.). The physical locations of each UE may be identified based on the visual information obtained by the base station.

At block 1008, the base station 1004 may determine that the UE 1002 is an interfering UE on condition that the UE is served by one of: a different network than a network of the base station, a same network as the network of the base station and using dynamic time division duplexing (TDD), or the base station using a full duplex scheme. The base station may perform any of the subsequent blocks of FIG. 10, including accessing the channel as described above with respect to FIGS. 4-9, when the UE is determined to be an interfering UE. For example, the base station may perform vision-based channel access as described according to the fourth aspect illustrated in FIG. 7, or vision-based LBT as described according to the fifth aspect illustrated in FIG. 8, on condition that the detected UE 702, 802 is served by a different network than a network of base station 704, 804, is served by a same network as the network of the base station 704, 804 that uses a dynamic time division duplexing (TDD) scheme, or is served by the base station and using a full duplex scheme. The base station may determine any of the above conditions from UE capability information or from other reports received from the UEs.

At block 1010, the base station may identify beam information associated with a physical location of the UE based on the visual information. The one or more beams may be based on the beam information. For instance, the base station may identify beam indices corresponding to beams directed towards or away from detected UEs, whose presence has been identified from the visual information as described above. For example, referring to FIGS. 4-9, the beam information (e.g. beam information 410, 510, 610, 710, 810, 910) may include a beam index or a subset of beam indices corresponding to one or more beams (e.g. beams 412, 512, 514, 612, 614, 712, 714, 718, 812, 814, 818, 912, 914) directed towards or away from physical locations (e.g. physical locations 406, 506, 606, 706, 806, 906) of the UEs.

The visual information may also include base station position information, and the one or more beams may be based on the base station position information. For example, the base station may determine a subset of the beams from a codebook to deploy for communicating with UEs based on base station position information (e.g. ceiling-mounting, wall-mounting, etc.). The base station position information may be identified from the visual information (e.g. ceilings, walls, etc.). For instance, referring to FIGS. 4-9, out of 512 fine beams configured in the codebook, the base station may select 64 SSB beams which are identified as not pointing towards a wall or ceiling based on the visual information 408, 508, 608, 708, 808, 908.

At block 1012, the base station may determine a transmission (Tx) activity and/or a reception (Rx) activity of the UE and an interference characteristic of the UE, where the one or more beams are further based on the interference characteristic and the at least one of the transmission activity or reception activity. Transmission or reception activity may include, for example, transmissions or receptions of a particular UE (which may be identified as belonging to the UE based on AoA or reception beam indices corresponding to a particular beam), and interference characteristics may include, for example, sensed energy levels of the UE, sensed preambles, uplink radio measurements, and tracked UE positions including changing positions and Doppler-induced changes based on visual information including visual cues and temporal interference patterns. For example, referring to FIGS. 7 and 8, when attempting to communicate with the right UE 702, 802 over a shared channel, the base station 704, 804 may determine whether beam 712, 812 may interfere with transmissions or receptions of the left UE 702, 802 based on a transmission or reception activity and an interference characteristic of the left UE. For instance, if the base station determines that the left UE 702, 802 is inactive (e.g. the UE is not transmitting or receiving) and/or does not include any interference characteristics (e.g. sensed energy levels from the UE are low), the base station may select beam 712, 812 to communicate with the serving UE. For instance, the base station may access the shared channel over beam 712, 812 without performing CCA or LBT (in FIG. 7) or after successfully performing CCA or LBT (in FIG. 8).

At block 1014, the base station may access a shared channel to communicate with the UE based on the visual information. For instance, as further described below with respect to blocks 1016, 1018, and 1020, the base station may determine based on the visual information, and/or based on the Tx/Rx activity and interference characteristics determined at block 1012, whether or not to perform CCA or LBT over the beams identified at block 1008 before accessing the shared channel to communicate with the UE.

In one example, at block 1016, the base station may select a first subset of beams to perform a CCA or LBT procedure and a second subset of beams to refrain from performing the CCA or the LBT procedure based on the visual information and the beam information. For example, referring to FIG. 5, the base station may identify beam information 510 associated with the physical locations 506 of the detected UEs, such as beam indices corresponding to beams 512 directed towards or away from the physical locations 506 of the UEs. The physical locations 506 may be identified based on visual information 508 obtained by the base station. The beam information 510 may also include beam indices corresponding to beams 514 that are not directed towards or away from detected UEs. Accordingly, when attempting to communicate with UEs 502 over a shared channel 516, the base station may select to perform CCA or LBT to access the channel when communicating over beams 512 and may select to refrain from performing CCA or LBT to access the channel when communicating over beams 514.

In another aspect of block 1016, the base station may select a first subset of beams to perform a CCA or LBT procedure and a second subset of beams to refrain from performing the CCA or the LBT procedure based on the visual information, the beam information, and line-of-sight information and/or non-line-of-sight information of the UE. For example, referring to FIG. 8, the base station may identify beam information 810 associated with the physical locations 806 of the detected UEs, such as beam indices corresponding to beams 812, 814, 818 directed towards or away from the physical locations 806 of the UEs. The physical locations 806 may be identified based on visual information 808 obtained by the base station. When attempting to communicate with the right UE 802 over a shared channel 820, the base station may determine that beam 812 may interfere with transmissions or receptions of the left UE 802, but that beams 814, 818 do not interfere with the left UE 802, based on the visual information 808, beam information 810, line of sight geometry (in the case of left beam 814) or non-line of sight geometry (in the case of right beam 814 reflected by reflector 816 as beam 818). Accordingly, the base station may select to perform CCA or LBT to access the shared channel 820 when communicating with the serving UE over beam 812, while the base station may select to refrain from performing CCA or LBT to access the shared channel 820 when communicating with the serving UE over beams 814, 818.

At block 1018, the base station may perform the CCA or the LBT procedure over the first subset of the one or more beams, where the shared channel may be accessed for the first subset of the one or more beams when the CCA or the LBT procedure is successful, and where the shared channel may be accessed for the second subset of the one or more beams without performing the CCA or the LBT procedure. For example, referring to FIGS. 5 and 8, the base station may perform CCA or LBT to determine if the shared channel 516, 820 is clear over beams 512, 812 prior to accessing the channel and communicating with the UEs in those beam directions. The base station may access the shared channel 516, 820 for beams 512, 812 when the performed CCA or LBT is successful. In contrast, the base station may access the shared channel 516, 820 for beams 514, 814, 818 without performing CCA or LBT.

In another aspect of block 1018, the base station may perform a CCA or LBT procedure over a wider beam of the one or more beams. The shared channel may be accessed for a narrower beam of the one or more beams based on the visual information or the beam information when the CCA or the LBT procedure fails for the wider beam. For example, referring to FIG. 6, the base station may identify beam information 610 associated with the physical locations 606 of the detected UEs, such as beam indices corresponding to beams 614 that are not directed towards or away from the physical locations 606 of detected UEs. The physical locations 606 may be identified based on visual information 608 obtained by the base station. When attempting to communicate with the UEs 602 over a shared channel, the base station may perform CCA or LBT to access the channel over a wide beam 616 which is wider than the narrow beams 614. If the performed CCA or LBT fails, the base station may still access the shared channel for the narrow beams 614 without performing another CCA or LBT.

Referring to another example of block 1014, the shared channel may be accessed without performing a CCA or a LBT procedure based on the visual information and the beam information and at least one of line-of-sight information or non-line-of-sight information of the UE. For example, referring to FIG. 7, the base station may identify beam information 710 associated with the physical locations 706 of the detected UEs, such as beam indices corresponding to beams 712, 714, 718 directed towards or away from the physical locations 706 of the UEs. The physical locations 706 may be identified based on visual information 708 obtained by the base station. When attempting to communicate with the right UE 702 over a shared channel, the base station may determine that beams 714, 718 do not interfere with the left UE 702 or other detected UEs based on the visual information 708, beam information 710, line of sight geometry (in the case of left beam 714) or non-line of sight geometry (in the case of right beam 714 reflected by reflector 716 as beam 718). Accordingly, when the base station selects one of the beams 714, 718 to communicate with the serving UE, the base station may access the shared channel without performing CCA or LBT.

At block 1020, the base station may refrain from using at least one beam for communicating with the UE based on an unidentified interference source. Alternatively at block 1020, the base station may perform a CCA or LBT procedure over the at least one beam for communicating with the UE based on the unidentified interference source. The unidentified interference source may be, for example, a UE that is undetected from the visual information. The base station may determine the presence of an unidentified interference source, for example, based on Tx/Rx activity and/or interference characteristics determined at block 1012. For instance, referring to FIGS. 7 and 8, the base station 704, 804 may determine based on UE identification (e.g. interference characteristic and transmission/reception activity determination) that beams 718, 818 experience interference from one or more undetected UEs. For example, reflector 716, 816 may be obstructing an unidentified interference source (e.g. an undetected UE) that interferes with beams 718, 818. As a result, the base station may refrain from using beams 718, 818 (e.g. via right beam 714, 814) for communicating with the right UE 702, 802 based on the presence of the unidentified interference source. Alternatively, the base station may perform CCA or LBT (e.g. on-demand LBT) over beam 718, 818 (e.g. via right beam 714, 814) for communicating with the right UE 702, 802 based on the presence of the unidentified interference source.

At block 1022, the base station may determine one or more clusters of the UE and other UEs based on the visual information. For example, referring to FIG. 9, the base station may determine one or more clusters 916 of UEs 902 based on visual information 908. For example, the base station may determine that the UEs in one or more physical locations 906 (identified based on visual information 908) which are within the same vicinity may be grouped into the same cluster 916, while the UEs in physical locations which are far away from each other may grouped into different clusters 916. For instance, the base station may determine that UEs which are more than 10 feet apart from each other (or some other number) may be in separate physical locations or vicinities and therefore grouped into separate clusters.

At block 1024, the base station may assign autonomous uplink resources to the UE and the other UEs for communicating when the UE and the other UEs are in a same cluster, or the base station may assign orthogonal resources to the UE and the other UEs for communicating when the UE and the other UEs are in different clusters. For example, referring to FIG. 9, after grouping the UEs 902 into one or more clusters 916, the base station may assign autonomous uplink resources 918 to the UEs 902 which are grouped in the same cluster for communicating over their respective beams 912. Similarly, the base station may assign orthogonal resources 920 to the UEs which are grouped in different clusters for communicating over their respective beams 914.

At block 1026, the base station may determine whether the base station or the UE is indoor or outdoor based on the visual information for at least a subset of the one or more beams, where the base station communicates with the UE based on the determination. For example, the base station may determine whether the base station or one or more UEs are indoors or outdoors based on obtained visual information (e.g. visual cues in images captured by a camera of the base station, such as windows, walls, etc.). Based on this determination, the base station may switch its medium access method, e.g. using a different energy detection (ED) threshold or LBT mechanism, and/or switch its transmit power, e.g. Equivalent Isotropically Radiated Power (EIRP), in order to further optimize communication with the UEs. In one example, the base station may determine whether the base station or a UE is indoors or outdoors based on a hard determination, e.g., that all beams determined to correspond to a physical location of the UE (or base station) are directed indoors or outdoors. In another example, the base station may perform a soft indoor/outdoor determination, e.g., based on a subset of the beams. For instance, if the base station is indoors and if n beams are determined to be associated with a physical location of a UE, the base station may determine that the UE is outdoors if k of the n beams point outdoors, e.g., through a window.

At block 1028, the base station may communicate with the UE over the shared channel using one or more beams based on the visual information. For example, referring to FIGS. 4-9, after accessing the shared channel, the base station 404, 504, 604, 704, 804, 904 may send downlink transmissions or receive uplink communications from the UEs 402, 502, 602, 702, 802, 902 over respective beams 412, 512, 514, 612, 614, 712, 714, 718, 812, 814, 818, 912, 914 determined based on the visual information 408, 508, 608, 708, 808, 908. The base station may also communicate with the UE based on determined Tx/Rx activity, interference characteristics, unidentified interference sources, autonomous uplink resources or orthogonal resources, indoor/outdoor determinations, and base station position information, as described according to the various aspects above.

Figure 11A:
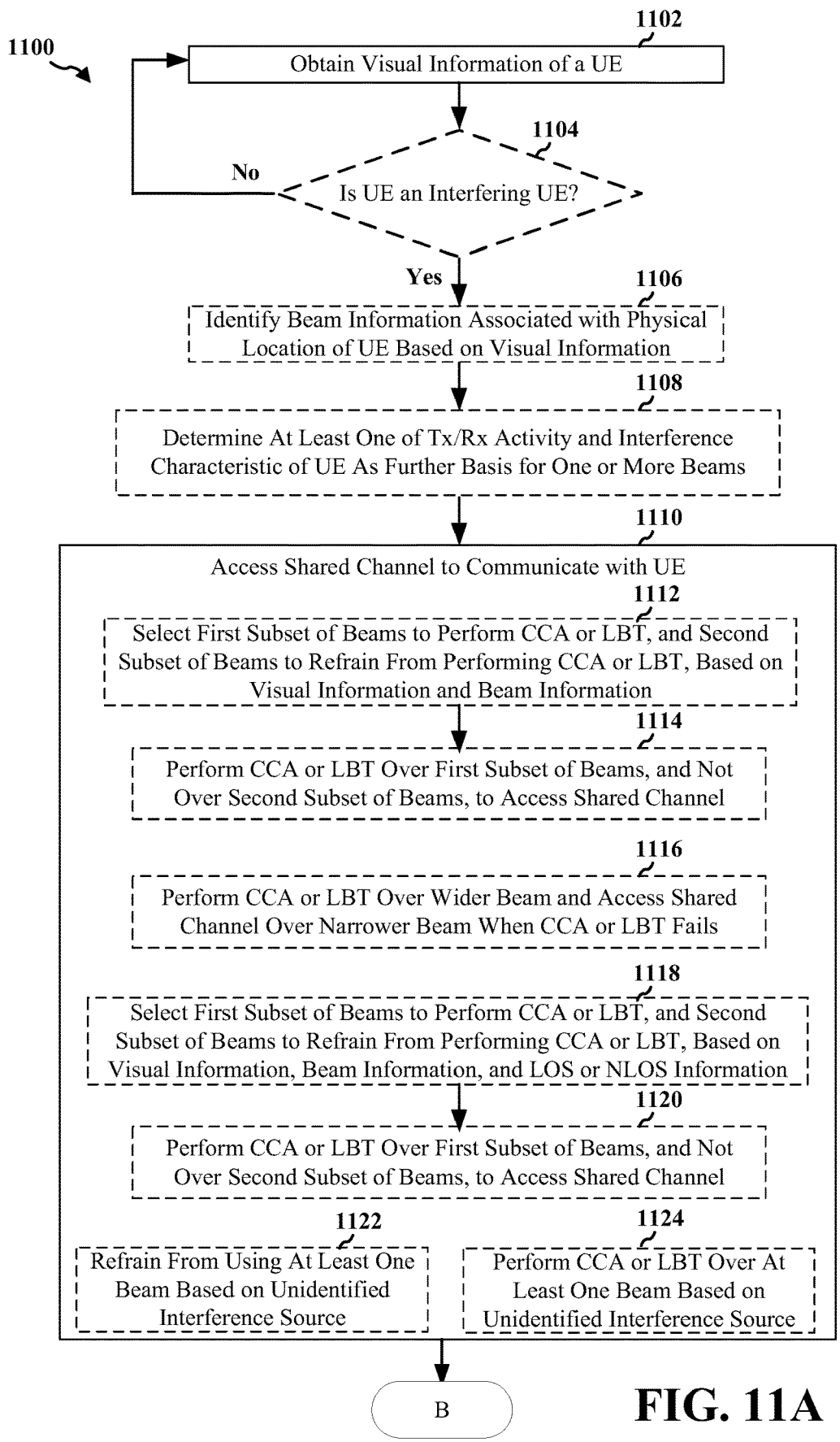
FIGS. 11A and 11B are a flowchart of a method of wireless communication of a base station.
Figure 11B:
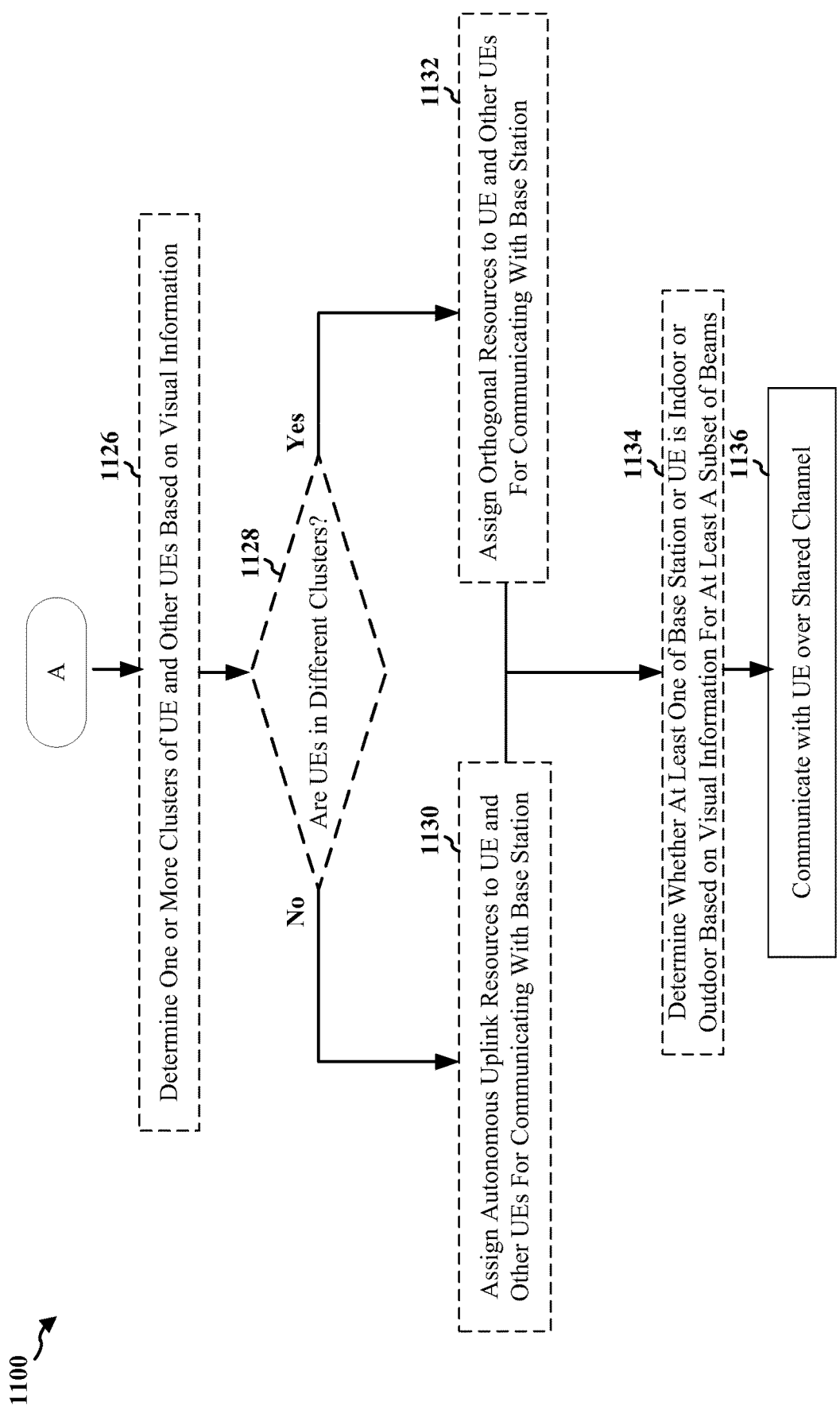

FIGS. 11A and 11B are a flowchart 1100 of a method of wireless communication. The method may be performed by a base station 310 (e.g., the base station 102/180, 310, 404, 504, 604, 704, 804, 904, 1004; the apparatus 1202/1202'; the processing system 1314, which may include the memory 376 and which may be the entire base station 310 or a component of the base station 310, such as the TX processor 316, the RX processor 370, and/or the controller/processor 375). Optional aspects are illustrated in dashed lines. The method allows a base station to use visual information of interfering UEs for optimizing shared channel access and beam and interference management and tracking.

Referring to FIG. 11A, at 1102, the base station obtains visual information of a UE. For example, 1102 may be performed by visual information component 1206 in FIG. 12. For instance, as described above with respect to FIG. 10, at block 1006, the base station 1004 may obtain visual information of a UE 1002.

At 1104, the base station may determine whether the UE is an interfering UE on condition that the UE is served by one of: a different network than a network of the base station; a same network as the network of the base station and using dynamic time division duplexing (TDD); or the base station using a full duplex scheme. For example, 1104 may be performed by interfering UE component 1208 in FIG. 12. For instance, as described above with respect to FIG. 10, at block 1008, the base station 1004 may determine that the UE 1002 is an interfering UE on condition that the UE is served by one of: a different network than a network of the base station 1004, a same network as the network of the base station 1004 and using dynamic time division duplexing (TDD), or the base station 1004 using a full duplex scheme.

In one example, if the UE does not meet any of the above conditions or is otherwise determined to not possibly cause or suffer interference due to downlink or uplink transmissions by the base station or other devices, the base station may access the shared channel and communicate with the UE normally (e.g. without optimization using visual information as described throughout this disclosure), and the base station may continue to obtain visual information, at 1102, of other UEs. Otherwise, in this example, if the base station determines that the UE is an interfering UE, the base station may continue to perform the following steps of FIG. 11.

At 1106, the base station may identify beam information associated with a physical location of the UE based on the visual information, where the one or more beams are based on the beam information. For example, 1106 may be performed by beam information identification component 1210 in FIG. 12. For instance, as described above with respect to FIG. 10, at block 1010, the base station 1004 may identify beam information associated with a physical location of the UE 1002 based on the visual information.

In one example of 1106, the visual information may include base station position information, and the one or more beams may be based on the base station position information. For instance, referring to FIGS. 4-9, the base station 404, 504, 604, 704, 804, 904 may determine a subset of the beams from a codebook to deploy for communicating with UEs based on base station position information (e.g. ceiling-mounting, wall-mounting, etc.). The base station position information may be identified from the visual information (e.g. ceilings, walls, etc.). For instance, out of 512 fine beams configured in the codebook, the base station may select 64 SSB beams which are identified as not pointing towards a wall or ceiling based on the visual information 408, 508, 608, 708, 808, 908.

At 1108, the base station may determine at least one of a transmission activity or a reception activity of the UE and an interference characteristic of the UE, where the one or more beams are further based on the interference characteristic and the at least one of the transmission activity or reception activity. For example, 1108 may be performed by activity and interference determination component 1212 in FIG. 12. For instance, as described above with respect to FIG. 10, at block 1012, the base station 1004 may determine a transmission (Tx) activity and/or a reception (Rx) activity of the UE 1002 and an interference characteristic of the UE 1002.

At 1110, the base station accesses a shared channel to communicate with the UE based on the visual information. For example, 1110 may be performed by shared channel access component 1214 in FIG. 12. For instance, as described above with respect to FIG. 10, at block 1014, the base station 1004 may access a shared channel to communicate with the UE 1002 based on the visual information. For example, the base station may perform a CCA or LBT procedure to gain access to the channel, or refrain from performing a CCA or LBT procedure to gain access to the channel, for one or more beams based on the visual information obtained at 1102, the beam information identified at 1106, and/or the Tx/Rx activity or interference characteristics determined at 1108. In one example, as part of accessing the shared channel, the base station may perform one or more of the following steps 1112, 1114, 1116, 1118, 1120, 1122, or 1124 of FIG. 11, as described below.

At 1112, the base station may select a first subset of the one or more beams to perform a CCA or a LBT procedure and a second subset of the one or more beams to refrain from performing the CCA or the LBT procedure based on the visual information and the beam information. For example, 1112 may be performed by beam selection component 1216 in FIG. 12. For instance, as described above with respect to FIG. 5 and FIG. 10 at block 1016, the base station 504, 1004 may select a first subset of beams (e.g. beams 512) to perform a CCA or LBT procedure and a second subset of beams (e.g. beams 514) to refrain from performing the CCA or the LBT procedure based on the visual information 508 and the beam information 510.

At 1114, the base station may perform the CCA or the LBT procedure over the first subset of the one or more beams selected at 1112, where the shared channel is accessed (at 1110) for the first subset of the one or more beams when the CCA or the LBT procedure is successful, and where the shared channel is accessed (at 1110) for the second subset of the one or more beams without performing the CCA or the LBT procedure. For example, 1114 may be performed by CCA/LBT performance component 1218 in FIG. 12. For instance, as described above with respect to FIG. 5 and FIG. 10 at block 1018, the base station may perform CCA or LBT to determine if the shared channel 516 is clear over beams 512 prior to accessing the channel and communicating with the UEs in those beam directions. The base station may access the shared channel 516 for beams 512 when the performed CCA or LBT is successful. In contrast, the base station may access the shared channel 516 for beams 514 without performing CCA or LBT.

At 1116, the base station may perform a CCA or a LBT procedure over a wider beam of the one or more beams, where the shared channel is accessed (at 1110) for a narrower beam of the one or more beams based on at least one of the visual information or the beam information when the CCA or the LBT procedure fails for the wider beam. For example, 1116 may also be performed by CCA/LBT performance component 1218 in FIG. 12. For instance, as described above with respect to FIG. 6 and FIG. 10 at block 1018, when attempting to communicate with the UEs 602 over a shared channel using beams identified based on visual information 608 and beam information 610, the base station 604 may perform CCA or LBT to access the channel over a wide beam 616 which is wider than the narrow beams 614. If the performed CCA or LBT fails, the base station may still access the shared channel for the narrow beams 614 without performing another CCA or LBT.

In one example of step 1110, the shared channel may be accessed without performing a CCA or a LBT procedure based on the visual information and the beam information and at least one of line-of-sight information or non-line-of-sight information of the UE. For instance, as described above with respect to FIG. 7 and FIG. 10 at block 1014, when attempting to communicate with the right UE 702 over a shared channel, the base station may determine that beams 714, 718 do not interfere with the left UE 702 or other detected UEs based on the visual information 708, beam information 710, line of sight geometry (in the case of left beam 714) or non-line of sight geometry (in the case of right beam 714 reflected by reflector 716 as beam 718). Accordingly, when the base station selects one of the beams 714, 718 to communicate with the serving UE, the base station may access the shared channel without performing CCA or LBT.

At 1118, the base station may select a first subset of the one or more beams to perform a CCA or a LBT procedure and a second subset of the one or more beams to refrain from performing the CCA or the LBT procedure based on the visual information, the beam information, and at least one of line-of-sight information or non-line-of-sight information of the UE. For example, 1118 may also be performed by beam selection component 1216 in FIG. 12. For instance, as described above with respect to FIG. 8 and FIG. 10 at block 1016, when attempting to communicate with the right UE 802 over a shared channel 820, the base station may determine that beam 812 may interfere with transmissions or receptions of the left UE 802, but that beams 814, 818 do not interfere with the left UE 802, based on the visual information 808, beam information 810, line of sight geometry (in the case of left beam 814) or non-line of sight geometry (in the case of right beam 814 reflected by reflector 816 as beam 818). Accordingly, the base station may select to perform CCA or LBT to access the shared channel 820 when communicating with the serving UE over beam 812, while the base station may select to refrain from performing CCA or LBT to access the shared channel 820 when communicating with the serving UE over beams 814, 818.

At 1120, the base station may perform the CCA or the LBT procedure over the first subset of the one or more beams selected at 1118, where the shared channel is accessed (at 1110) for the first subset of the one or more beams when the CCA or the LBT procedure is successful, and where the shared channel is accessed (at 1110) for the second subset of the one or more beams without performing the CCA or the LBT procedure. For example, 1120 may also be performed by CCA/LBT performance component 1218 in FIG. 12. For instance, as described above with respect to FIG. 8 and FIG. 10 at block 1018, the base station may perform CCA or LBT to determine if the shared channel 820 is clear over beams 812 prior to accessing the channel and communicating with the UEs in those beam directions. The base station may access the shared channel 820 for beams 812 when the performed CCA or LBT is successful. In contrast, the base station may access the shared channel 820 for beams 814, 818 without performing CCA or LBT.

At 1122, the base station may refrain from using at least one beam of the one or more beams for the communicating (at 1136) based on an unidentified interference source. For example, 1122 may be performed by beam refrain component 1220 of FIG. 12. For instance, as described above with respect to FIGS. 7, 8 and FIG. 10 at block 1020, the base station 1004 may refrain from using at least one beam for communicating with the UE 1002 based on an unidentified interference source. For example, referring to FIGS. 7 and 8, the base station 704, 804 may determine based on UE identification (e.g. interference characteristic and transmission/reception activity determination) that beams 718, 818 experience interference from one or more undetected UEs. As a result, the base station may refrain from using beams 718, 818 (e.g. via right beam 714, 814) for communicating with the right UE 702, 802 based on the presence of the unidentified interference source.

At 1124, the base station may perform a CCA or a LBT procedure over the at least one beam for the communicating (at 1136) based on the unidentified interference source. For example, 1124 may also be performed by CCA/LBT performance component 1218 in FIG. 12. For instance, as described above with respect to FIGS. 7, 8 and FIG. 10 at block 1020, the base station 1004 may perform a CCA or LBT procedure over the at least one beam for communicating with the UE 1002 based on the unidentified interference source. For example, referring to FIGS. 7 and 8, the base station 704, 804 may determine based on UE identification (e.g. interference characteristic and transmission/reception activity determination) that beams 718, 818 experience interference from one or more undetected UEs. As a result, the base station may perform CCA or LBT (e.g. on-demand LBT) over beam 718, 818 (e.g. via right beam 714, 814) for communicating with the right UE 702, 802 based on the presence of the unidentified interference source.

Referring to FIG. 11B, at 1126, the base station may determine one or more clusters of the UE and other UEs based on the visual information. For example, 1126 may be performed by cluster determination component 1222 in FIG. 12. For instance, as described above with respect to FIG. 10 at block 1022, the base station 1004 may determine one or more clusters of the UE 1002 and other UEs based on the visual information.

At 1128, the base station may identify whether the UE and the other UEs are in the same cluster or in different clusters of the one or more clusters. When the base station determines at 1128 that the UE and the other UEs are in a same cluster of the one or more clusters, then at 1130, the base station may assign autonomous uplink resources to the UE and the other UEs for the communicating (at 1136). For example, 1130 may be performed by autonomous resource assignment component 1224 in FIG. 12. For instance, as described above with respect to FIG. 9 and FIG. 10 at block 1024, the base station 904, 1004 may assign autonomous uplink resources 918 to the UE 902, 1002 and the other UEs 902 for communicating when the UE 1002 and the other UEs 902 are in a same cluster 916.

Otherwise, when the base station determines at 1128 that the UE and the other UEs are in different clusters of the one or more clusters, then at 1132, the base station may assign orthogonal resources to the UE and the other UEs for the communicating (at 1136). For example, 1132 may be performed by orthogonal resource assignment component 1226 in FIG. 12. For instance, as described above with respect to FIG. 9 and FIG. 10 at block 1024, the base station 904, 1004 may assign orthogonal resources 920 to the UE 902, 1002 and the other UEs 902 for communicating when the UE 1002 and the other UEs 902 are in different clusters 916.

At 1134, the base station may determine whether at least one of the base station or the UE is indoor or outdoor based on the visual information for at least a subset of the one or more beams, where the communicating (at 1136) is based on the determination. For example, 1134 may be performed by indoor/outdoor determination component 1228 in FIG. 12. For instance, as described above with respect to FIG. 10 at block 1026, the base station 1004 may determine whether the base station 1004 or the UE 1002 is indoor or outdoor based on the visual information for at least a subset of the one or more beams (e.g. k of the n beams for a soft indoor/outdoor determination), where the base station communicates with the UE based on the determination (e.g. by switching its medium access method and/or switching its transmit power).

Finally, at 1136, the base station communicates with the UE over the shared channel using one or more beams based on the visual information. For example, 1136 may be performed by communication component 1230 in FIG. 12. For instance, as described above with respect to FIG. 10 at block 1028, the base station 1004 may communicate with the UE 1002 over the shared channel using one or more beams based on the visual information.

Figure 12:
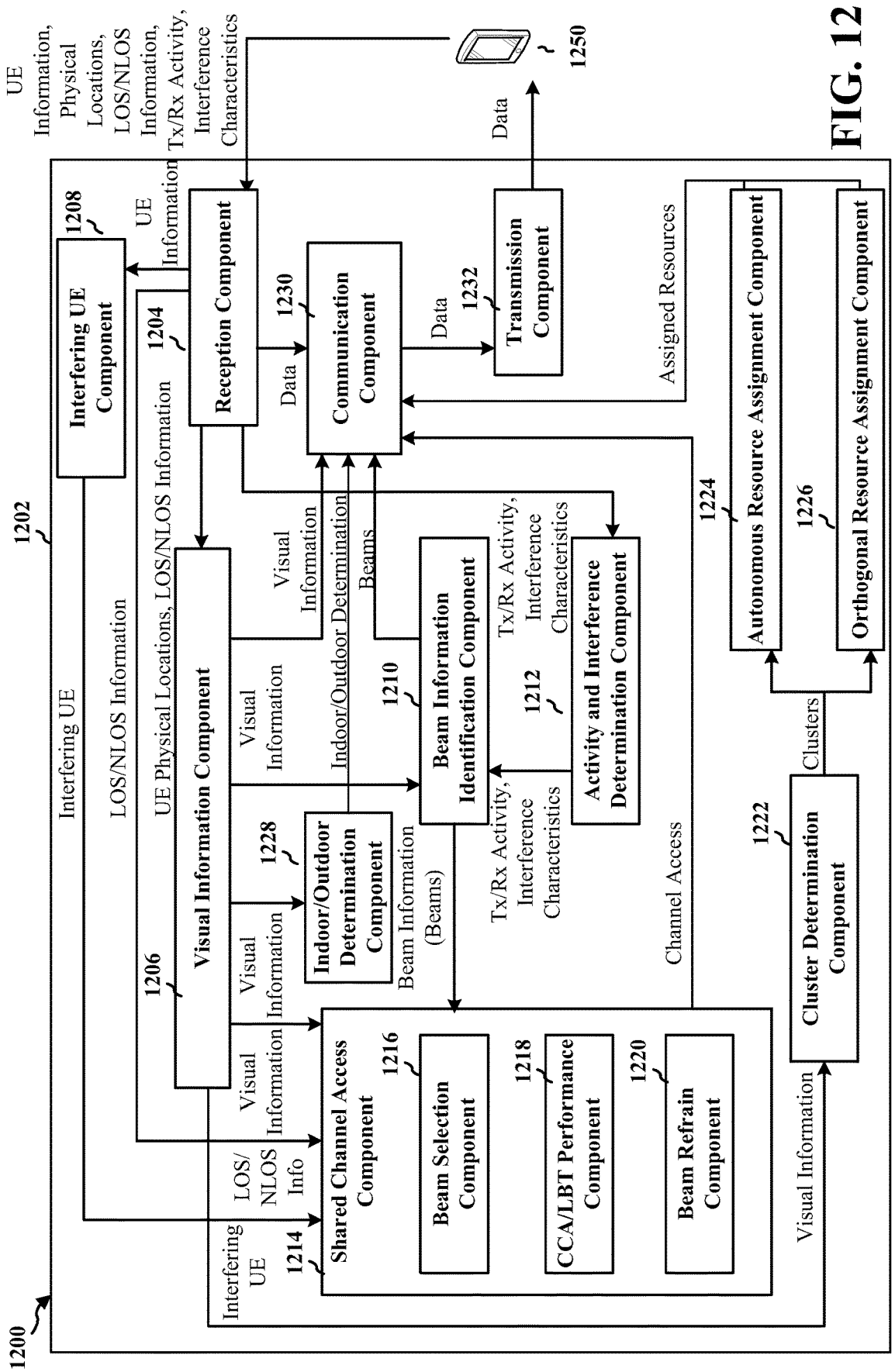
FIG. 12 is a conceptual data flow diagram illustrating the data flow between different means/components in an example apparatus.

FIG. 12 is a conceptual data flow diagram 1200 illustrating the data flow between different means/components in an example apparatus 1202. The apparatus may be a base station (e.g. base station 102/180, 310, 404, 504, 604, 704, 804, 904, 1004). The apparatus includes a reception component 1204 that receives uplink transmissions and other information from a UE 1250 (e.g. UE 104, 350, 402, 502, 602, 702, 802, 902, 1002). For example, the information may include UE information indicating whether the UE is served by a different network than a network of the base station, a same network as the network of the base station and using dynamic time division duplexing (TDD); or the base station using a full duplex scheme. The information may also include a physical location of the UE (e.g. captured by a camera of the base station), line-of-sight (LOS) or non-line-of-sight (NLOS) information (e.g. reflectors, etc.), Tx/Rx activity, and interference characteristics of the UE.

The apparatus 1202 includes a visual information component 1206 that is configured to obtain visual information of a UE, e.g., as described in connection with 1102 of FIG. 11A. For instance, the visual information may be obtained via the reception component 1204 and may include a physical location of the UE captured by a camera of the base station, LOS/NLOS information, etc. The apparatus 1202 may also include an interfering UE component 1208 that is configured to determine, based on the UE information received via the reception component 1204, whether the UE is an interfering UE, e.g., as described in connection with 1104 of FIG. 11A. The interfering UE component may make such determination on condition, for example, that the UE is served by one of: a different network than a network of the base station; a same network as the network of the base station and using dynamic time division duplexing (TDD); or the base station using a full duplex scheme. The apparatus 1202 may include a beam information identification component 1210 that is configured to identify beam information associated with a physical location of the UE based on the visual information obtained by visual information component 1206, e.g., as described in connection with 1106 of FIG. 11A. The apparatus 1202 may also include an activity and interference determination component 1212 that is configured to determine at least one of a transmission activity or a reception activity of the UE and an interference characteristic of the UE based on Tx/Rx activity and/or interference characteristics received from the UE via the reception component 1204, e.g., as described in connection with 1108 of FIG. 11A.

The apparatus 1202 further includes a shared channel access component 1214 that is configured to access a shared channel to communicate with the UE 1250 based on the visual information, e.g., as described in connection with 1110 of FIG. 11A. The shared channel access component 1214 may be configured to access the shared channel according to the various aspects described in this disclosure if the UE 1250 is determined to be an interfering UE by the interfering UE component 1208. The shared channel access component 1214 may also be configured to access the shared channel to communicate with the UE using one or more beams based on the beam information identified by the beam information identification component 1210, the visual information (including LOS/NLOS information) obtained by the visual information component 1206, and the Tx/Rx activity and interference characteristics determined by the activity and interference determination component 1212.

The shared channel access component 1214 may include a beam selection component 1216, a CCA/LBT performance component 1218, and a beam refrain component 1220. The beam selection component 1216 may be configured to select a first subset of the one or more beams to perform a CCA or a LBT procedure and a second subset of the one or more beams to refrain from performing the CCA or the LBT procedure based on the visual information, the beam information, and/or at least one of line-of-sight information or non-line-of-sight information of the UE, e.g., as described in connection with 1112 and 1118 of FIG. 11A. The CCA/LBT performance component 1218 may be configured to perform the CCA or the LBT procedure over the first subset of the one or more beams, e.g., as described in connection with 1114, 1116, and 1120 of FIG. 11A. The CCA/LBT performance component 1218 may be configured to access the shared channel for the first subset of the one or more beams when the CCA or the LBT procedure is successful, and to access the shared channel for the second subset of the one or more beams without performing the CCA or the LBT procedure. The beam refrain component 1220 may be configured to refrain from using at least one beam of the one or more beams for communicating with the UE 1250 based on an unidentified interference source, e.g., as described in connection with 1122 of FIG. 11A. The CCA/LBT performance component 1218 may also be configured to perform a CCA or a LBT procedure over the at least one beam for communicating with the UE 1250 based on the unidentified interference source, e.g., as described in connection with 1124 of FIG. 11A.

The apparatus 1202 may further include a cluster determination component 1222 that is configured to determine one or more clusters of the UE 1250 and other UEs based on the visual information obtained by visual information component 1206, e.g., as described in connection with 1126 of FIG. 11B. The apparatus 1202 may also include an autonomous resource assignment component 1224 that is configured to assign autonomous uplink resources to the UE 1250 and the other UEs for communicating when the UE 1250 and the other UEs are in a same cluster of the one or more clusters determined by cluster determination component 1222, e.g., as described in connection with 1130 of FIG. 11B. Furthermore, the apparatus 1202 may include an orthogonal resource assignment component 1226 that is configured to assign orthogonal resources to the UE 1250 and the other UEs for communicating when the UE 1250 and the other UEs are in different clusters of the one or more clusters determined by cluster determination component 1222, e.g., as described in connection with 1132 of FIG. 11B. Additionally, the apparatus 1202 may include an indoor/outdoor determination component 1228 that is configured to determine whether at least one of the base station (apparatus 1202) or the UE 1250 is indoor or outdoor based on the visual information obtained by visual information component 1206 for at least a subset of the one or more beams identified by beam information identification component 1210, e.g., as described in connection with 1134 of FIG. 11B.

Moreover, the apparatus 1202 includes a communication component 1230 that is configured to communicate with the UE 1250 over the shared channel (accessed by shared channel access component 1214) using one or more beams (identified by the beam information identification component 1210) based on the visual information (obtained by visual information component 1206), e.g., as described in connection with 1136 of FIG. 11B. The communication component 1230 may be configured to receive uplink transmissions from the UE 1250 via the reception component 1204 and send downlink transmissions to the UE via a transmission component 1232, for instance, using the resources assigned by autonomous resource assignment component 1224 (e.g. autonomous uplink resources) or orthogonal resource assignment component 1226. The communication component may also be configured to communicate with UE 1250 based on, for example, an indoor/outdoor determination from indoor/outdoor determination component 1228 (e.g. by switching a medium access method, modifying transmission power, etc.). The apparatus 1202 further includes the transmission component 1232, which is configured to transmit data and other downlink communications to UE 1250.

The apparatus may include additional components that perform each of the blocks of the algorithm in the aforementioned flowchart of FIGS. 11A and 11B. As such, each block in the aforementioned flowchart of FIGS. 11A and 11B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
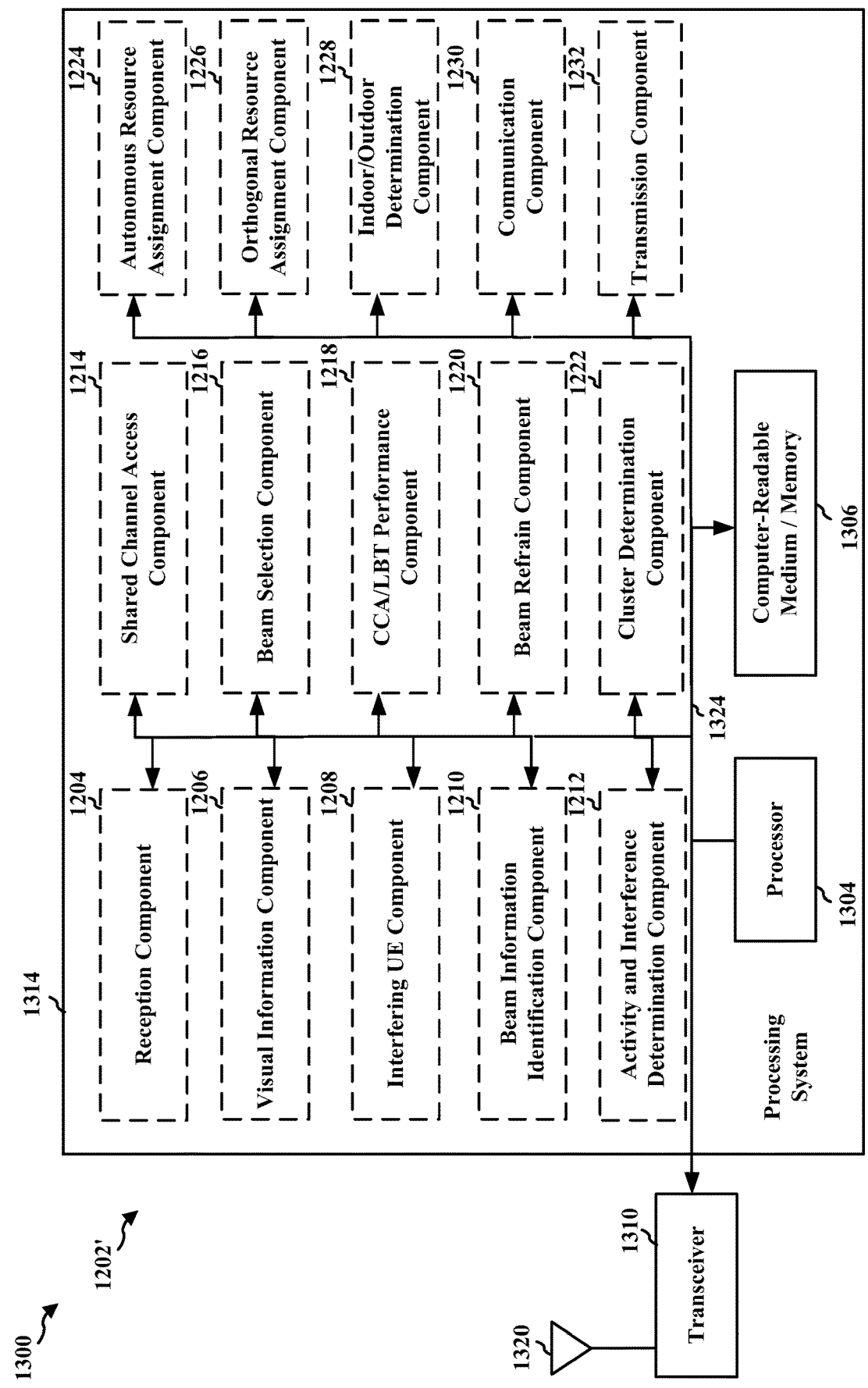
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212, 1214, 1216, 1218, 1220, 1222, 1224, 1226, 1228, 1230, 1232 and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1232, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212, 1214, 1216, 1218, 1220, 1222, 1224, 1226, 1228, 1230, 1232. The components may be software components running in the processor 1304, resident/stored in the computer readable medium/memory 1306, one or more hardware components coupled to the processor 1304, or some combination thereof. The processing system 1314 may be a component of the base station 310 and may include the memory 376 and/or at least one of the TX processor 316, the RX processor 370, and the controller/processor 375. Alternatively, the processing system 1314 may be the entire base station (e.g., see 310 of FIG. 3).

In one configuration, the apparatus 1202/1202' for wireless communication includes means for obtaining visual information of a user equipment (UE); means for accessing a shared channel to communicate with the UE based on the visual information; and means for communicating with the UE over the shared channel using one or more beams based on the visual information.

In one configuration, the apparatus 1202/1202' may include means for identifying beam information associated with a physical location of the UE based on the visual information, wherein the one or more beams are based on the beam information. In one configuration, the visual information may include base station position information, and the one or more beams may be based on the base station position information.

In one configuration, the apparatus 1202/1202' may include means for selecting a first subset of the one or more beams to perform a CCA or a LBT procedure and a second subset of the one or more beams to refrain from performing the CCA or the LBT procedure based on the visual information and the beam information; and means for performing the CCA or the LBT procedure over the first subset of the one or more beams, wherein the shared channel is accessed for the first subset of the one or more beams when the CCA or the LBT procedure is successful, and wherein the shared channel is accessed for the second subset of the one or more beams without performing the CCA or the LBT procedure.

In one configuration, the apparatus 1202/1202' may include means for performing a CCA or a LBT procedure over a wider beam of the one or more beams, wherein the shared channel is accessed for a narrower beam of the one or more beams based on at least one of the visual information or the beam information when the CCA or the LBT procedure fails for the wider beam.

In one configuration, the shared channel may be accessed without performing a CCA or a LBT procedure based on the visual information and the beam information and at least one of line-of-sight information or non-line-of-sight information of the UE. In one configuration, the apparatus 1202/1202' may further include means for determining at least one of a transmission activity or a reception activity of the UE and an interference characteristic of the UE, wherein the one or more beams are further based on the interference characteristic and the at least one of the transmission activity or reception activity. In one configuration, the apparatus 1202/1202' may additionally include means for determining the UE to be an interfering UE on condition that the UE is served by one of: a different network than a network of the base station; a same network as the network of the base station and using dynamic TDD; or the base station using a full duplex scheme.

In one configuration, the apparatus 1202/1202' may include means for selecting a first subset of the one or more beams to perform a CCA or a LBT procedure and a second subset of the one or more beams to refrain from performing the CCA or the LBT procedure based on the visual information, the beam information, and at least one of line-of-sight information or non-line-of-sight information of the UE; and means for performing the CCA or the LBT procedure over the first subset of the one or more beams, wherein the shared channel is accessed for the first subset of the one or more beams when the CCA or the LBT procedure is successful, and wherein the shared channel is accessed for the second subset of the one or more beams without performing the CCA or the LBT procedure. In one configuration, the apparatus 1202/1202' may further include means for determining at least one of a transmission activity or a reception activity of the UE and an interference characteristic of the UE, wherein the one or more beams are further based on the interference characteristic and the at least one of the transmission activity or reception activity. In one configuration, the apparatus 1202/1202' may additionally include means for determining the UE to be an interfering UE on condition that the UE is served by one of: a different network than a network of the base station; a same network as the network of the base station and using dynamic TDD; or the base station using a full duplex scheme.

In one configuration, the apparatus 1202/1202' may include means for refraining from using at least one beam of the one or more beams for the communicating based on an unidentified interference source; or means for performing a CCA or a LBT procedure over the at least one beam for the communicating based on the unidentified interference source.

In one configuration, the apparatus 1202/1202' may include means for determining one or more clusters of the UE and other UEs based on the visual information. In one configuration, the apparatus 1202/1202' may further include means for assigning autonomous uplink resources to the UE and the other UEs for the communicating when the UE and the other UEs are in a same cluster of the one or more clusters; or means for assigning orthogonal resources to the UE and the other UEs for the communicating when the UE and the other UEs are in different clusters of the one or more clusters.

In one configuration, the apparatus 1202/1202' may include means for determining whether at least one of the base station or the UE is indoor or outdoor based on the visual information for at least a subset of the one or more beams, wherein the communicating is based on the determination.

The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Thus, the present disclosure allows the base station to use visual information of interfering UEs for optimizing shared channel access (e.g. performing CCA/LBT in the unlicensed spectrum), and beam and interference management and tracking. For example, in the first aspect, the base station may use visual information to detect or track the position of UEs and identify beams associated with the positions of the UEs, thereby providing more efficient channel access and communication. In following aspects, such efficiencies may be further improved. For example, in the second aspect, rather than performing CCA or LBT over every beam to access a shared channel, the base station may perform CCA or LBT over a subset of beams based on visual information and beam information, resulting in faster and more efficient channel access. Moreover, in the third aspect, further efficiencies may be obtained since, rather than performing individual CCAs or LBT procedures over various narrow beams, the base station may perform a single CCA or LBT procedure over a wide beam and, even if the CCA or LBT procedure fails, access a shared channel over narrow beams within the wide beam. Furthermore, in the fourth and fifth aspects, additional efficiencies may be achieved by allowing the base station to access the shared channel over certain beams without performing CCA or LBT, or selectively performing CCA or LBT over certain beams, based on visual information and LOS/NLOS information. In addition, greater accuracy in selecting the beams according to the fourth or fifth aspects may be achieved based on Tx/Rx activity and interference characteristics determined from the UEs. Moreover, the aforementioned aspects may be rendered even more efficient by limiting performance of the above aspects to those UEs determined as interfering UEs. Finally, collisions in resource overloading for autonomous uplink transmissions may be reduced based on clustering using visual information, communications may be optimized based on hard or soft indoor/outdoor determinations using visual information, and beams for communicating with UEs may be fine-tuned according to base station position information also identified using visual information.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a base station comprising:
   obtaining visual information of a user equipment (UE);
   accessing a shared channel to communicate with the UE based on the visual information; and
   communicating with the UE over the shared channel using one or more beams based on the visual information.

2. The method of claim 1, further comprising:
   identifying beam information associated with a physical location of the UE based on the visual information, wherein the one or more beams are based on the beam information.

3. The method of claim 2, further comprising:
   selecting a first subset of the one or more beams to perform a clear channel assessment (CCA) or a listen before talk (LBT) procedure and a second subset of the one or more beams to refrain from performing the CCA or the LBT procedure based on the visual information and the beam information; and
   performing the CCA or the LBT procedure over the first subset of the one or more beams, wherein the shared channel is accessed for the first subset of the one or more beams when the CCA or the LBT procedure is successful, and wherein the shared channel is accessed for the second subset of the one or more beams without performing the CCA or the LBT procedure.

4. The method of claim 2, further comprising:
   performing a clear channel assessment (CCA) or a listen before talk (LBT) procedure over a wider beam of the one or more beams, wherein the shared channel is accessed for a narrower beam of the one or more beams based on at least one of the visual information or the beam information when the CCA or the LBT procedure fails for the wider beam.

5. The method of claim 2, wherein the shared channel is accessed without performing a clear channel assessment (CCA) or a listen before talk (LBT) procedure based on the visual information and the beam information and at least one of line-of-sight information or non-line-of-sight information of the UE.

6. The method of claim 5, further comprising:
   determining at least one of a transmission activity or a reception activity of the UE and an interference characteristic of the UE, wherein the one or more beams are further based on the interference characteristic and the at least one of the transmission activity or reception activity.

7. The method of claim 6, further comprising:
   determining the UE to be an interfering UE on condition that the UE is served by one of:
   a different network than a network of the base station;
   a same network as the network of the base station and using dynamic time division duplexing (TDD); or
   the base station using a full duplex scheme.

8. The method of claim 2, further comprising:
   selecting a first subset of the one or more beams to perform a clear channel assessment (CCA) or a listen before talk (LBT) procedure and a second subset of the one or more beams to refrain from performing the CCA or the LBT procedure based on the visual information, the beam information, and at least one of line-of-sight information or non-line-of-sight information of the UE; and
   performing the CCA or the LBT procedure over the first subset of the one or more beams, wherein the shared channel is accessed for the first subset of the one or more beams when the CCA or the LBT procedure is successful, and wherein the shared channel is accessed for the second subset of the one or more beams without performing the CCA or the LBT procedure.

9. The method of claim 8, further comprising:
determining at least one of a transmission activity or a reception activity of the UE and an interference characteristic of the UE, wherein the one or more beams are further based on the interference characteristic and the at least one of the transmission activity or reception activity.

10. The method of claim 9, further comprising:
determining the UE to be an interfering UE on condition that the UE is served by one of:
a different network than a network of the base station;
a same network as the network of the base station and using dynamic time division duplexing (TDD); or
the base station using a full duplex scheme.

11. The method of claim 1, further comprising:
refraining from using at least one beam of the one or more beams for the communicating based on an unidentified interference source; or
performing a clear channel assessment (CCA) or a listen before talk (LBT) procedure over the at least one beam for the communicating based on the unidentified interference source.

12. The method of claim 1, further comprising:
determining one or more clusters of the UE and other UEs based on the visual information;
assigning autonomous uplink resources to the UE and the other UEs for the communicating when the UE and the other UEs are in a same cluster of the one or more clusters; or
assigning orthogonal resources to the UE and the other UEs for the communicating when the UE and the other UEs are in different clusters of the one or more clusters.

13. The method of claim 1, further comprising:
determining whether at least one of the base station or the UE is indoor or outdoor based on the visual information for at least a subset of the one or more beams, wherein the communicating is based on the determination.

14. The method of claim 1, wherein the visual information includes base station position information, and the one or more beams are based on the base station position information.

15. An apparatus for wireless communication, comprising:
means for obtaining visual information of a user equipment (UE);
means for accessing a shared channel to communicate with the UE based on the visual information; and
means for communicating with the UE over the shared channel using one or more beams based on the visual information.

16. An apparatus for wireless communication, comprising:
a memory; and
at least one processor coupled to the memory and configured to:
obtain visual information of a user equipment (UE);
access a shared channel to communicate with the UE based on the visual information; and
communicate with the UE over the shared channel using one or more beams based on the visual information.

17. The apparatus of claim 16, wherein the at least one processor is further configured to:
identify beam information associated with a physical location of the UE based on the visual information, wherein the one or more beams are based on the beam information.

18. The apparatus of claim 17, wherein the at least one processor is further configured to:
select a first subset of the one or more beams to perform a clear channel assessment (CCA) or a listen before talk (LBT) procedure and a second subset of the one or more beams to refrain from performing the CCA or the LBT procedure based on the visual information and the beam information; and
perform the CCA or the LBT procedure over the first subset of the one or more beams, wherein the shared channel is accessed for the first subset of the one or more beams when the CCA or the LBT procedure is successful, and wherein the shared channel is accessed for the second subset of the one or more beams without performing the CCA or the LBT procedure.

19. The apparatus of claim 17, wherein the at least one processor is further configured to:
perform a clear channel assessment (CCA) or a listen before talk (LBT) procedure over a wider beam of the one or more beams, wherein the shared channel is accessed for a narrower beam of the one or more beams based on at least one of the visual information or the beam information when the CCA or the LBT procedure fails for the wider beam.

20. The apparatus of claim 17, wherein the shared channel is accessed without performing a clear channel assessment (CCA) or a listen before talk (LBT) procedure based on the visual information and the beam information and at least one of line-of-sight information or non-line-of-sight information of the UE.

21. The apparatus of claim 20, wherein the at least one processor is further configured to:
determine at least one of a transmission activity or a reception activity of the UE and an interference characteristic of the UE, wherein the one or more beams are further based on the interference characteristic and the at least one of the transmission activity or reception activity.

22. The apparatus of claim 21, wherein the apparatus comprises a base station, and wherein the at least one processor is further configured to:
determine the UE to be an interfering UE on condition that the UE is served by one of:
a different network than a network of the base station;
a same network as the network of the base station and using dynamic time division duplexing (TDD); or
the base station using a full duplex scheme.

23. The apparatus of claim 17, wherein the at least one processor is further configured to:
select a first subset of the one or more beams to perform a clear channel assessment (CCA) or a listen before talk (LBT) procedure and a second subset of the one or more beams to refrain from performing the CCA or the LBT procedure based on the visual information, the beam information, and at least one of line-of-sight information or non-line-of-sight information of the UE; and
perform the CCA or the LBT procedure over the first subset of the one or more beams, wherein the shared channel is accessed for the first subset of the one or more beams when the CCA or the LBT procedure is successful, and wherein the shared channel is accessed for the second subset of the one or more beams without performing the CCA or the LBT procedure.

24. The apparatus of claim 23, wherein the at least one processor is further configured to:
determine at least one of a transmission activity or a reception activity of the UE and an interference characteristic of the UE, wherein the one or more beams are further based on the interference characteristic and the at least one of the transmission activity or reception activity.

25. The apparatus of claim 24, wherein the apparatus comprises a base station, and wherein the at least one processor is further configured to:
determine the UE to be an interfering UE on condition that the UE is served by one of:
a different network than a network of the base station;
a same network as the network of the base station and using dynamic time division duplexing (TDD); or
the base station using a full duplex scheme.

26. The apparatus of claim 16, wherein the at least one processor is further configured to:
refrain from using at least one beam of the one or more beams for the communicating based on an unidentified interference source; or
perform a clear channel assessment (CCA) or a listen before talk (LBT) procedure over the at least one beam for the communicating based on the unidentified interference source.

27. The apparatus of claim 16, wherein the at least one processor is further configured to:
determine one or more clusters of the UE and other UEs based on the visual information;
assign autonomous uplink resources to the UE and the other UEs for the communicating when the UE and the other UEs are in a same cluster of the one or more clusters; or
assign orthogonal resources to the UE and the other UEs for the communicating when the UE and the other UEs are in different clusters of the one or more clusters.

28. The apparatus of claim 16, wherein the apparatus comprises a base station, and wherein the at least one processor is further configured to:
determine whether at least one of the base station or the UE is indoor or outdoor based on the visual information for at least a subset of the one or more beams, wherein the communicating is based on the determination.

29. The apparatus of claim 16, wherein the visual information includes base station position information, and the one or more beams are based on the base station position information.

30. A non-transitory computer-readable medium storing computer executable code, the code when executed by a processor cause the processor to:
obtain visual information of a user equipment (UE);
access a shared channel to communicate with the UE based on the visual information; and
communicate with the UE over the shared channel using one or more beams based on the visual information.

* * * * *